United States Patent
Kulkarni et al.

(10) Patent No.: US 10,655,516 B2
(45) Date of Patent: *May 19, 2020

(54) SYSTEMS FOR REDUCING STARTUP EMISSIONS IN POWER PLANT INCLUDING GAS TURBINE

(71) Applicant: General Electric Company, Schenectady, NY (US)

(72) Inventors: Parag Prakash Kulkarni, Niskayuna, NY (US); Lewis Berkley Davis, Jr., Niskayuna, NY (US); Raymond Pang, Glenville, NY (US); Gordon Raymond Smith, Ballston Spa, NY (US)

(73) Assignee: General Electric Company, Schenectady, NY (US)

( * ) Notice: Subject to any disclaimer, the term of this patent is extended or adjusted under 35 U.S.C. 154(b) by 588 days.

This patent is subject to a terminal disclaimer.

(21) Appl. No.: 15/437,703

(22) Filed: Feb. 21, 2017

(65) Prior Publication Data
US 2018/0238211 A1    Aug. 23, 2018

(51) Int. Cl.
*F01N 3/021*  (2006.01)
*F01N 3/035*  (2006.01)
(Continued)

(52) U.S. Cl.
CPC ............ *F01N 3/0211* (2013.01); *F01D 25/30* (2013.01); *F01K 23/103* (2013.01); *F01N 3/035* (2013.01);
(Continued)

(58) Field of Classification Search
CPC ...... F01N 3/0211; F01N 3/0215; F01N 3/035; F01N 3/2066; F01N 3/103;
(Continued)

(56) References Cited

U.S. PATENT DOCUMENTS

| 4,426,320 A | * | 1/1984 | Ernest ................... | B01D 53/86 502/313 |
| 4,698,078 A | * | 10/1987 | Mavros .................. | B01D 46/10 55/313 |

(Continued)

FOREIGN PATENT DOCUMENTS

| EP | 1275907 A2 * | 1/2003 | ............ F24F 1/0007 |
| EP | 1275907 B1 | 1/2005 | |

(Continued)

OTHER PUBLICATIONS

Search Report and Written Opinion for PCT Application No. PCT/US2018/018948 dated Jun. 27, 2018, 5 pages.
(Continued)

*Primary Examiner* — Jason H Duger
(74) *Attorney, Agent, or Firm* — Charlotte Wilson; Hoffman Warnick LLC

(57) ABSTRACT

Embodiments of emission reduction system including various embodiments of an emission filters for a power plant including a gas turbine are disclosed. The system includes: an emission filter; and a retraction system operably coupled to an exhaust passage of the gas turbine. The exhaust passage defines an exhaust path of exhaust from the gas turbine. The retraction system selectively moves the emission filter between a first location within the exhaust path and a second location out of the exhaust path. In a combined cycle power plant, the first location is upstream of a heat recovery steam generator (HRSG). The systems and filters described allow for temporary positioning of emission filter(s) just downstream of a gas turbine exhaust outlet, or upstream of an HRSG, where provided, for emission reduction at low loads or startup conditions, and removal of the emission filter(s) once operations move to higher loads.

16 Claims, 18 Drawing Sheets

(51) Int. Cl.
   *F01D 25/30*   (2006.01)
   *F01N 3/20*   (2006.01)
   *F01K 23/10*   (2006.01)
   *F01N 5/02*   (2006.01)
   *F02C 6/18*   (2006.01)
   *F01K 7/18*   (2006.01)

(52) U.S. Cl.
   CPC ............. *F01N 3/2066* (2013.01); *F01N 5/02* (2013.01); *F01K 7/18* (2013.01); *F01K 23/106* (2013.01); *F01N 2250/02* (2013.01); *F01N 2290/00* (2013.01); *F01N 2410/00* (2013.01); *F01N 2610/02* (2013.01); *F02C 6/18* (2013.01); *Y02E 20/16* (2013.01)

(58) Field of Classification Search
   CPC ............. F01N 2250/02; F01N 2610/05; F01N 2290/00; F01N 2290/06; F01N 2410/00; F01N 2410/02; F01N 2410/03; F01N 2410/06; F01N 2410/10; F01N 2450/30; F01N 2610/02; F01N 2900/1404; F01N 5/02; F01N 9/002; F01N 31/009; F01D 25/30; F01D 25/305; F02C 6/18; F02C 9/28; F01K 7/18; F01K 23/10; F01K 23/106; F01K 23/103; B01D 29/096; B01D 46/008; B01D 46/0058; B01D 2273/14
   See application file for complete search history.

(56) References Cited

U.S. PATENT DOCUMENTS

| | | | | |
|---|---|---|---|---|
| 6,063,164 | A * | 5/2000 | Mergy | .................. B01D 41/04 |
| | | | | 55/467 |
| 7,044,993 | B1 | 5/2006 | Bolduc | |
| 7,186,290 | B2 * | 3/2007 | Sheehan | ............ B01D 46/0028 |
| | | | | 95/277 |
| 7,654,076 | B2 * | 2/2010 | Wills | .................... F01N 3/0842 |
| | | | | 123/300 |
| 8,491,845 | B2 | 7/2013 | Ettireddy et al. | |
| 9,399,927 | B2 | 7/2016 | McDeed et al. | |
| 2004/0182055 | A1 | 9/2004 | Wynn | |
| 2009/0284013 | A1 * | 11/2009 | Anand | ............... B01D 53/8625 |
| | | | | 290/52 |
| 2014/0360154 | A1 * | 12/2014 | Benz | ......................... F02C 3/34 |
| | | | | 60/39.52 |
| 2015/0204241 | A1 | 7/2015 | McDeed et al. | |
| 2016/0032803 | A1 | 2/2016 | Ettireddy et al. | |
| 2016/0367941 | A1 * | 12/2016 | Gilbert | ............... B01D 53/9468 |

FOREIGN PATENT DOCUMENTS

| | | |
|---|---|---|
| JP | 06226024 A | 8/1994 |
| JP | H06-226024 A | 8/1994 |
| KR | 20130079780 A | 7/2013 |
| KR | 1020130079780 A | 7/2013 |
| WO | 2009156910 A2 | 12/2009 |

OTHER PUBLICATIONS

International Search Report and Written Opinion issued in connection with corresponding PCT Application No. PCT/US2018/018948 dated Jun. 27, 2018.
U.S. Appl. No. 15/437,771, Office Action dated Sep. 30, 2019, 15 pgs.
U.S. Appl. No. 15/437,780, Office Action dated Sep. 30, 2019, 15 pgs.
U.S. Appl. No. 15/437,785, Office Action dated Sep. 30, 2019, 14 pgs.
U.S. Appl. No. 15/437,794, Office Action dated Sep. 30, 2019, 19 pgs.
U.S. Appl. No. 15/437,785, Notice of Allowance dated Jan. 29, 2020, 13 pages.
U.S. Appl. No. 15/437,771, Notice of Allowance dated Feb. 3, 2020, 8 pages.
U.S. Appl. No. 15/437,780, Notice of Allowance dated Feb. 5, 2020, 8 pages.
U.S. Appl. No. 15/437,794, Notice of Allowance dated Feb. 5, 2020, 9 pages.

* cited by examiner

SYSTEMS FOR REDUCING STARTUP EMISSIONS IN POWER PLANT INCLUDING GAS TURBINE

CROSS-REFERENCE TO RELATED APPLICATIONS

This application is related to U.S. application Ser. Nos. 15/437,771, 15/437,780, 15/437,785, and 15/437,794, filed concurrently and currently pending.

BACKGROUND OF THE INVENTION

The disclosure relates generally to power plants, and more particularly, to a system for reducing startup emissions in a power plant including a gas turbine.

Gas turbine systems are widely used to generate power. Combined cycle power plants employ a gas turbine system and a steam turbine system to generate power. As gas turbine systems and combined cycle power plants have progressed, power plants using the systems have had increasing operational demands placed upon them. In particular, power plants have been required to remain operational over a larger load spectrum while also meeting environmental regulations. One challenge relating to gas turbine system operation is meeting environmental regulations, e.g., nitrogen dioxide (NOx) and/or carbon monoxide (CO) limitations, during low load operations such as during startup of the system. For example, some environmental regulations require NOx emissions to be as low as 19 kilograms/hour during start up emissions, which is increasingly difficult with larger gas turbine systems. During the start-up of the gas turbine system, a number of operational characteristics create high NOx and CO emissions. For example, in a combined cycle power plant, gas turbine system exhaust may be at about 370° Celsius at startup (approximately 5-20% load) to allow heat recovery steam generator (HRSG) warmup (traditional thermal stress mitigation), mating of steam temperature matching for steam turbine system start, reheat pressure reduction for steam turbine system start (HP turbine section) and gas turbine system fuel heating.

During normal higher load operation, emissions from a gas turbine system are typically controlled by two emission control systems. First, a selective catalytic reduction (SCR) system converts NOx to nitrogen, water and carbon dioxide ($CO_2$) by causing the exhaust to react with a reducing agent, e.g., anhydrous ammonia, aqueous ammonia or urea. Second, the exhaust may be passed through a CO catalyst system to remove CO. However, during low load conditions of a combined cycle power plant, for example, the SCR system and the CO catalyst system are not active because they do not attain the desired operating temperature because they are located after any heat exchanger capable of creating the required heat, e.g., a superheater within the HRSG or a high pressure (HP) drum. For example, at startup it can take more than 30 minutes for the traditional emission control systems to reach sufficient operating temperatures to start reducing NOx and CO emissions. In this case, exhaust exits to atmosphere from the HRSG without emission control. During this initial period, the power plant may continue to emit NOx and CO emissions which are counted against the government issued permit limits for startup and overall yearly tons. This issue can end up putting restrictions on the power plant operability such as limitations on the number of starts and total hours of operation in a year. In order to address CO emissions, additional CO catalysts have been positioned upstream of a superheater, but such structure places further limitations on the power plant during full load operation. In another approach, the load of the gas turbine system is quickly raised from startup to a point where emissions are lower (referred to as 'rapid response'). However, this approach adds more equipment and complex control systems to the power plant.

BRIEF DESCRIPTION OF THE INVENTION

A first aspect of the disclosure provides an emission reduction system for a power plant including a gas turbine, the system comprising: an emission filter; and a retraction system operably coupled to an exhaust passage of the gas turbine, the exhaust passage defining an exhaust path of exhaust from the gas turbine, the retraction system selectively moving the emission filter between a first location within the exhaust path and a second location out of the exhaust path.

A second aspect of the disclosure provides a method of reducing emissions for a power plant including a gas turbine, the method comprising: providing an emission filter operably coupled to a retraction system that is operably coupled to an exhaust passage of the gas turbine, the exhaust passage defining an exhaust path of exhaust from the gas turbine; and selectively moving the emission filter, using the retraction system, between a first location within the exhaust path and a second location out of the exhaust path in response to an emission condition of the exhaust from the gas turbine.

A third aspect of the disclosure provides an emission reduction system for a power plant including a gas turbine, the system comprising: an emission filter including a first panel and a second panel, each panel including an open structure frame having a filter medium therein through which exhaust passes to remove an exhaust component of an exhaust of the gas turbine; and a retraction system operably coupled to an exhaust passage of the gas turbine, the exhaust passage defining an exhaust path of the exhaust from the gas turbine, the retraction system selectively laterally moving each of the first and second panels between a first location within the exhaust path within the exhaust passage and a second location out of the exhaust path.

A fourth aspect of the disclosure provides an emission reduction system for a power plant including a gas turbine, the system comprising: an emission filter including an open structure frame having a filter medium therein through which exhaust passes to remove an exhaust component of an exhaust of the gas turbine; and a retraction system operably coupled to an exhaust passage of the gas turbine, the exhaust passage defining an exhaust path of the exhaust from the gas turbine, the retraction system selectively vertically moving the emission filter through an opening in an upper wall of the exhaust passage between a first location within the exhaust path within the exhaust passage and a second location out of the exhaust path.

A fifth aspect of the disclosure provides an emission reduction system for a power plant including a gas turbine, the system comprising: a carbon monoxide (CO) catalyst filter through which exhaust passes to remove carbon monoxide from an exhaust of the gas turbine, the CO catalyst filter positioned upstream of a heat recover steam generator (HRSG) operably coupled to the exhaust passage of the gas turbine for generating steam for a steam turbine; and a retraction system operably coupled to an exhaust passage of the gas turbine, the exhaust passage defining an exhaust path of the exhaust from the gas turbine, the retraction system selectively moving the CO catalyst filter between a first location within the exhaust path within the exhaust passage and a second location out of the exhaust path.

A sixth aspect of the disclosure provides an emission filter for a power plant including a gas turbine, the emission filter comprising: a series of pivotally coupled panels, each panel including an open structure frame having a filter medium therein through which exhaust passes to remove an exhaust component of an exhaust of the gas turbine.

A seventh aspect of the disclosure provides an emission reduction system for a power plant including a gas turbine, the system comprising: an emission filter including a series of pivotally coupled panels, each panel including an open structure frame having an open structure frame having a filter medium therein therein through which the exhaust passes and a pair of opposing bearings extending from opposing ends of the respective panel; and a retraction system operably coupled to an exhaust passage of the gas turbine, the exhaust passage defining an exhaust path of exhaust from the gas turbine, the retraction system selectively moving the emission filter between a first location within the exhaust path and a second location out of the exhaust path.

The illustrative aspects of the present disclosure are designed to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

It is noted that the drawings of the disclosure are not to scale. The drawings are intended to depict only typical aspects of the disclosure, and therefore should not be considered as limiting the scope of the disclosure. In the drawings, like numbering represents like elements between the drawings.

DETAILED DESCRIPTION OF THE INVENTION

As an initial matter, in order to clearly describe the current disclosure it will become necessary to select certain terminology when referring to and describing relevant machine components within combined cycle power plant, gas turbine system and/or a heat recover steam generator. When doing this, if possible, common industry terminology will be used and employed in a manner consistent with its accepted meaning. Unless otherwise stated, such terminology should be given a broad interpretation consistent with the context of the present application and the scope of the appended claims. Those of ordinary skill in the art will appreciate that often a particular component may be referred to using several different or overlapping terms. What may be described herein as being a single part may include and be referenced in another context as consisting of multiple components. Alternatively, what may be described herein as including multiple components may be referred to elsewhere as a single part.

In addition, several descriptive terms may be used regularly herein, and it should prove helpful to define these terms at the onset of this section. These terms and their definitions, unless stated otherwise, are as follows. As used herein, "downstream" and "upstream" are terms that indicate a direction relative to the flow of a fluid, such as the working fluid through the turbine engine or, for example, the flow of exhaust through a heat recover steam generator. The term "downstream" corresponds to the direction of flow of the fluid, and the term "upstream" refers to the direction opposite to the flow. The terms "forward" and "aft," without any further specificity, refer to directions, with "forward" referring to the front or compressor end of the engine, and "aft" referring to the rearward or turbine end of the engine or HRSG end of the exhaust path. The term "axial" refers to movement or position parallel to an axis.

The disclosure provides emission reduction systems and filters that allow for temporary positioning of emission filter(s) just downstream of a gas turbine exhaust outlet, or upstream of an HRSG, where provided, for emission reduction at low loads or startup conditions, and removal of the emission filter(s) from the exhaust path once exhaust conditions change, e.g., due to operations moving to higher loads. For purposes of description, embodiments of the emission reduction systems and filters will be described relative to a combined cycle power plant. As will be apparent, the teachings of the disclosure are also applicable to any combustion system such as a gas turbine system.

Figure 1:
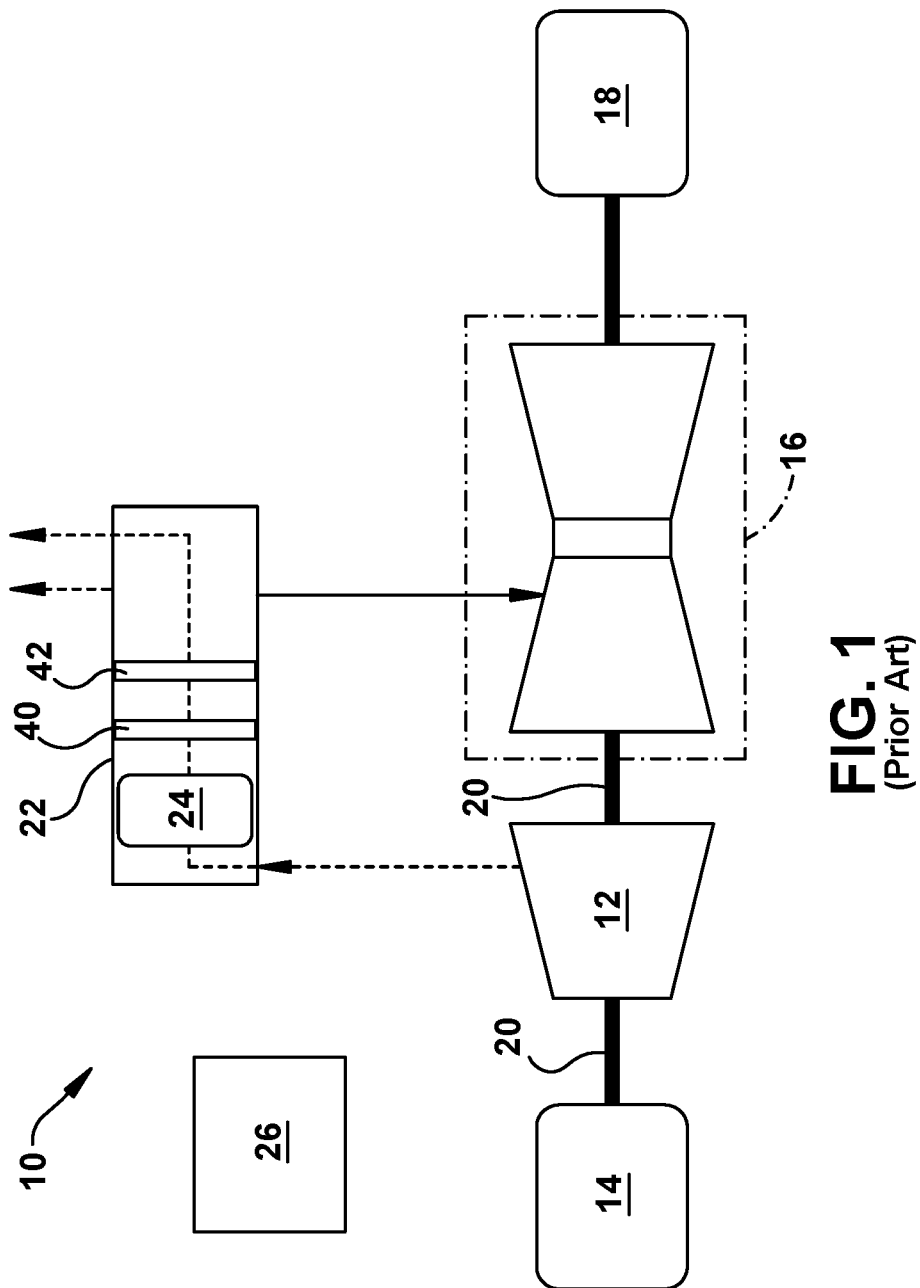
FIG. 1 shows a schematic diagram of an illustrative, conventional combined cycle power plant.

Turning to FIG. 1, a schematic view of portions of an illustrative, conventional combined cycle power plant 10 is shown. In the instant example, the power generating system is a single shaft system with two generators, but one with skill in the art will readily understand that the teachings of the disclosure are applicable to any variety of combined cycle power plant. Combined cycle power plant 10 may include a gas turbine system 12 operably connected to a generator 14, and a steam turbine system 16 operably coupled to another generator 18. Generator 14 and gas turbine system 12 may be mechanically coupled by a shaft 20, which may transfer energy between a drive shaft (not shown) of gas turbine system 12 and generator 14. Also shown in FIG. 1, a heat recover steam generator (HRSG) 22 is operably connected to gas turbine system 12 and steam turbine system 16. HRSG 22 may be fluidly connected to both gas turbine system 12 and steam turbine system 16 via conventional conduits (numbering omitted). It is understood that generators 14, 18 and shaft 20 may be of any size or type known in the art and may differ depending upon their application or the system to which they are connected. Common numbering of the generators and shafts is for clarity and does not necessarily suggest these generators or shafts are identical.

Figure 2:
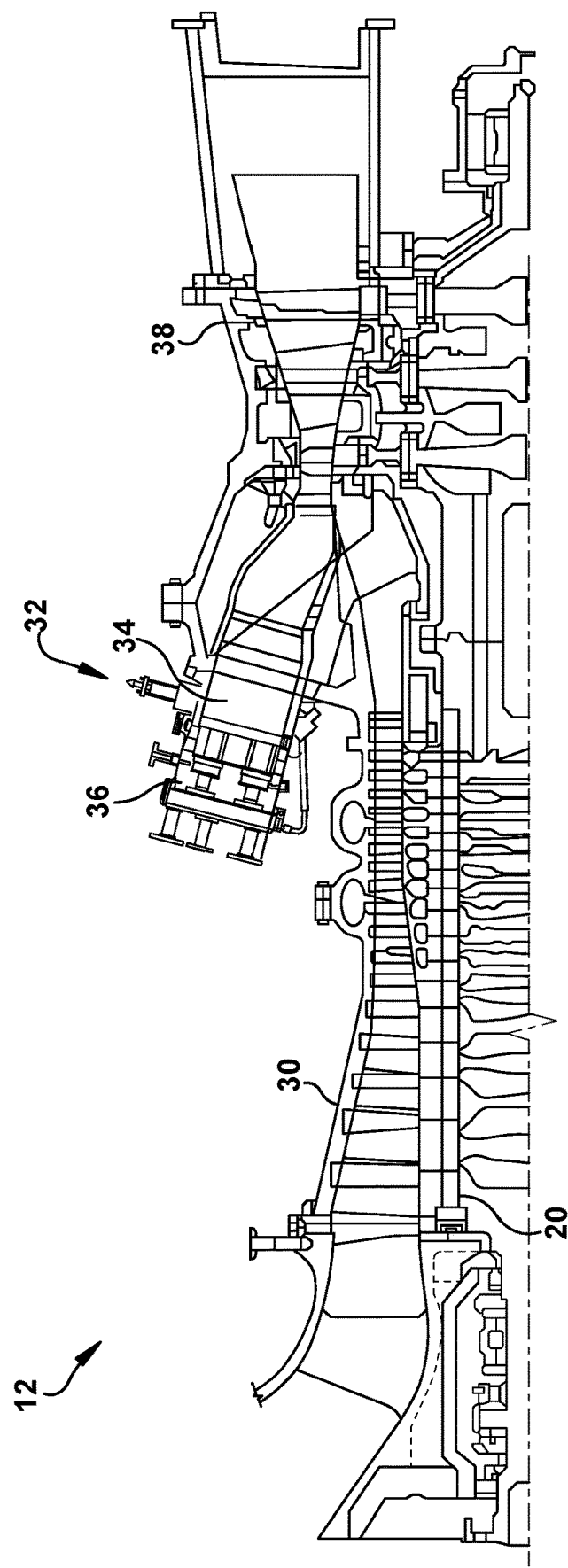
FIG. 2 shows a cross-sectional view of an illustrative, conventional gas turbine system.

As shown in the cross-sectional view of FIG. 2, a conventional gas turbine system 12 may include a compressor 30 and a combustor 32. Combustor 32 includes a combustion region 34 and a fuel nozzle assembly 36. Gas turbine system 12 also includes a gas turbine 38 coupled to common compressor/turbine shaft 20. In one embodiment, gas turbine system 12 is a MS7001FB engine, sometimes referred to as a 9FB engine, commercially available from General Electric Company, Greenville, S.C. The present disclosure is not limited to any one particular gas turbine system and may be implanted in connection with other engines. In operation, air enters the inlet of compressor 30, is compressed and then discharged to combustor 32 where fuel, heated according to embodiments of the disclosure, such as a gas, e.g., natural gas, or a fluid, e.g., oil, is burned to provide high energy combustion gases which drive gas turbine 38. In gas turbine 38, the energy of the hot gases is converted into work, some of which is used to drive compressor 30 through rotating shaft 20, with the remainder available for useful work to drive a load such as generator 14 via shaft 20 for producing electricity.

Returning to FIG. 1, the energy in the exhaust gases (dashed line) exiting gas turbine system 12 is converted into additional useful work. The exhaust gases enter HRSG 22 (heat exchanger) in which water is converted to steam in the manner of a boiler. Within HRSG 22, a superheater 24 may be provided to superheat the steam using the exhaust and/or another heat source prior to steam turbine system 16, e.g., a high pressure (HP) turbine thereof. Steam turbine system 16 may include one or more steam turbines, e.g., a high pressure (HP) turbine, an intermediate pressure (IP) turbine and a low pressure (LP) turbine, each of which are coupled to shaft 20. Each steam turbine includes a plurality of rotating blades (not shown) mechanically coupled to shaft 20. In operation, steam from various parts of HRSG 22 enters an inlet of at least one of the steam turbine(s), and is channeled to impart a force on blades thereof causing shaft 20 to rotate. As will be understood, steam from an upstream turbine may be employed later in a downstream turbine. The steam thus produced by HRSG 22 drives at least a part of steam turbine system 16 in which additional work is extracted to drive shaft 20 and an additional load such as second generator 18, in turn, produces additional electric power. A conventional power plant control system 26 may control the above-described components.

As noted, as combined cycle power plants have progressed, the overall systems have had increasing operational demands placed upon them. In particular, combined cycle power plants have been required to remain operational over a larger load spectrum while also meeting environmental regulations, which creates a challenge relating to gas turbine system operation in meeting environmental regulations, e.g., nitrogen dioxide (NOx) and/or carbon monoxide (CO) limitations, during low load operations such as during startup of the system. In particular, during the start-up of the gas turbine system, a number of operational characteristics create relatively high NOx and CO emissions. In one example, gas turbine system exhaust may be at about 370° C. at startup (approximately 5-20% load) to allow HRSG warmup (traditional thermal stress mitigation), mating of steam temperature with an ideal for steam turbine system start, reheat pressure reduction for steam turbine system start (HP turbine section) and gas turbine system fuel heating.

During normal higher load operation, emissions are typically controlled in a gas turbine system by two emission control systems. First, as shown in the prior art system of FIG. 1, the exhaust may be passed through a CO catalyst system 40 within HRSG 22 to remove CO. Second, a selective catalytic reduction (SCR) system 42 within HRSG 22 converts NOx to nitrogen and water by causing the exhaust (dashed line) to react with a reducing agent, e.g., anhydrous ammonia, aqueous ammonia or urea. System 40 and 42 may be interspersed within various heat transfer piping sets of HRSG 22. During low load conditions, SCR system 42 and CO catalyst system 40 are not active because they do not attain the desired operating temperature, for example, because they are located after superheater 24 (FIG. 1) or an HP drum (not shown). For example, at startup it can take more than 30 minutes for the traditional systems 40, 42 to reach sufficient operating temperatures to start reducing NOx and CO emissions. In this case, exhaust may exit to atmosphere from HRSG 22 (dotted line) without emission control. During this initial period, power plant 10 may continue to emit NOx and CO emissions which are counted against the permit limits for startup and overall yearly tons limit.

Embodiments of the disclosure provide emission reduction systems and methods that employ an emission filter(s) that is/are immediately after gas turbine system and upstream of any HRSG. The emission reduction systems use a retraction system for selectively moving the emission filter from a first location within an exhaust path and a second location outside of the exhaust path. The emission filter(s) can thus be employed in the first location upstream of the HRSG at which sufficient temperatures are reached for use of the emission filter(s) during startup or other low load conditions, and can be retracted out of the exhaust path during higher loads at which temperatures are too high and during which use of the emission filter(s) may lead to undesirable exhaust flow restrictions. The teachings of the disclosure will be described as applied to a combined cycle power plant, but may be applicable to gas turbine systems alone.

Figure 3:
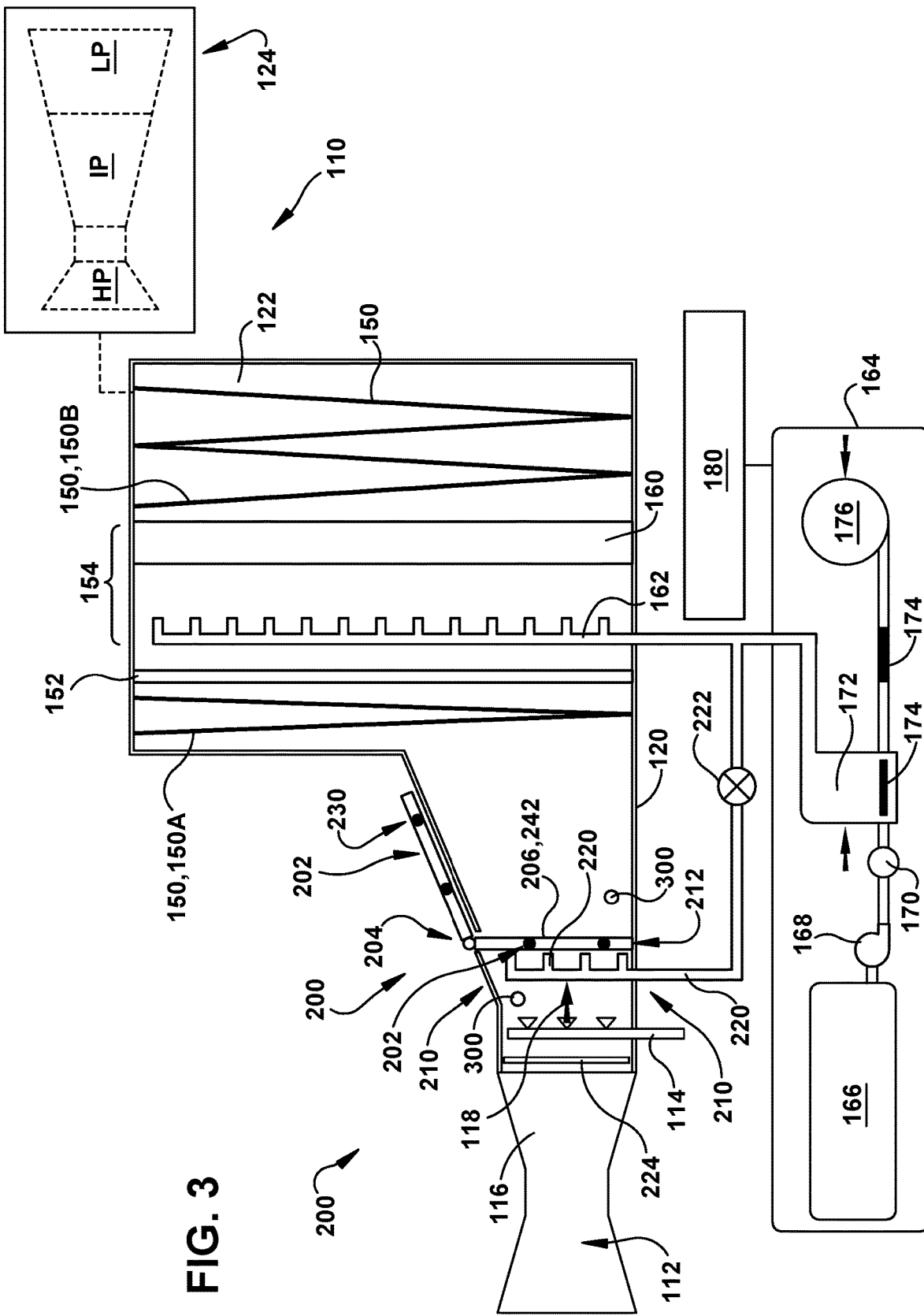
FIG. 3 shows a cross-sectional view of part of an emission reduction system according to an embodiment of the disclosure.

FIG. 3 shows a cross-sectional view of a portion of a combined cycle power plant 110 including a gas turbine system 112 operatively coupled to an HRSG 122, according to one embodiment. Gas turbine system 112 may include any combustion-based turbine system, as described herein. Gas turbine system 112 may also include a conventional duct burner 114 downstream of a turbine 116 thereof that burns any residual fuel in an exhaust 118 exiting turbine 116. As understood, exhaust 118 includes a variety of combustion exhaust such as carbon dioxide, carbon monoxide (CO), nitrogen oxide (NOx), etc. Exhaust 118 passes through an exhaust passage 120 operatively coupled to gas turbine 116 and configured to direct exhaust 118 downstream of gas turbine 116, e.g., to HRSG 122. Exhaust passage 120 may be an integral part of HRSG 122, or may be a separate passage upstream but operatively coupled to HRSG 122. In any event, exhaust passage 120 defines an exhaust path through which exhaust 118 must pass.

As understood, HRSG 122 is operably coupled to exhaust passage 120 of gas turbine 116 for generating steam for a steam turbine 124 (shown schematically in phantom in FIG. 3). HRSG 122 may include any now known or later developed steam generating heat exchanger. As understood in the art, HRSG 122 may include a number of sets of heating pipes 150 through which water and/or steam is passed to form steam or further heat steam. For example, HRSG 122 may include sets of pipes 150 that function as conventional parts of an HRSG such as but not limited to: superheater(s), economizer(s) and reheat section(s) for any number of steam turbine stages (i.e., HP, IP and/or LP). Any conventional steam or boiler drums (not shown) may also be provided relative to HRSG 122. HRSG 122 may also include any necessary piping or valving (not shown) to deliver water/steam, as necessary. HRSG 122 may also include bypass systems, valves, and attemperators to operate in rapid response mode.

HRSG 122 may also include conventional carbon monoxide (CO) catalyst filter 152 downstream of a first set of heat exchange pipes 150A. CO catalyst filter 152 may include any now known or later developed CO catalytic material capable of carrying out the desired catalytic conversion of CO to carbon dioxide ($CO_2$) or other less toxic pollutants in a conventional manner. HRSG 122 may also include a conventional selective catalytic reduction (SCR) system 154. As understood in the art, SCR system 154 converts NOx to nitrogen, water and carbon dioxide by causing the exhaust to react with a reducing agent, e.g., anhydrous ammonia, aqueous ammonia or urea. SCR system 154 may include a conventional SCR filter 160 and an SCR reducing agent injector 162 (e.g., an ammonia injection grid (AIG)) upstream of filter 160. SCR filter 160 may include, for example, metal oxide or zeolite based porous catalyst (e.g., $V205/TiO_2$). HRSG 122 may also have a combined SCR-CO catalyst instead of two separate catalysts. SCR reducing agent injector 162 may include any now known or later developed injector system such as an array of nozzles, sprayers, etc., capable of coating SCR filter 160 with reducing agent. SCR reducing agent injector 162 may be coupled to any form of reductant delivery system 164 including, for example, a reductant reservoir 166, a reductant pump 168, control valve(s) 170, evaporator 172, heaters 174 and an air compressor 176 for delivery of an air flow to entrain reducing agent therein. Any now known or later developed power plant controller 180 may be employed to control the afore-described components.

FIG. 3 also shows an emission reduction system 200 (hereinafter "ER system 200") for power plant 110 according to one embodiment of the disclosure. ER system 200 includes an emission filter 202, and a retraction system 204. As used herein, "emission filter" indicates all or part of any form of exhaust toxin removing or reducing system. As will be described, the emission filter can remove different forms of toxins and take on a variety of structural forms.

As shown in FIG. 3, in one embodiment, emission filter 202 takes the form of an SCR filter 206 of an SCR system 210 sized for a first location 212 within exhaust passage 120. More specifically, emission filter 202 may include any now known or later developed filter medium used for SCR. For example, SCR filter 206 may include a metal oxide or zeolite based porous catalyst (e.g., $V205/TiO_2$). As indicated, first location 212 is upstream of HRSG 122, and emission filter 202 (SCR filter 206) spans exhaust passage 120 and thus the exhaust path. Emission filter 202 may be smaller than conventional SCR filter 160 in HRSG 122 due to the size of exhaust passage 120 just downstream of gas turbine 116 compared to HRSG 122. In this embodiment, SCR system 210 may also include an SCR reducing agent injector 220, which may include any now known or later developed injector system such as an array of nozzles, sprayers, etc., capable of coating SCR filter 216 with reducing agent. As indicated, SCR reducing agent injector 220 is upstream of first location 212 of the exhaust passage. In one embodiment, SCR reducing agent injector 220 may be permanently mounted within exhaust passage 120, e.g., it includes metal piping and nozzles capable of withstanding the higher load temperatures of gas turbine 116. SCR reducing agent injector 220 may be coupled to any form of reducing agent delivery system. In the example shown, SCR reducing agent injector 220 is provided as an add-on to reductant delivery system 164. In this case, SCR reducing agent injector 220 is operatively coupled, e.g., via valves 222 and conduits (not numbered), to reductant delivery system 164. As explained, reductant delivery system 164 includes reductant reservoir 166, reductant pump 168, control valve(s) 170, evaporator 172, heaters 174 and air compressor 176 for delivery of an air flow to entrain reducing agent therein. In alternative embodiments, SCR reducing agent injector 220 may be coupled to its own standalone, and smaller, reducing agent delivery system, which would be structured similarly to system 164 without coupling to parts in HRSG 122. In any event, as will be described further herein, controller 180 can be modified, e.g., via hardware and/or software modifications, to control valve 222 that delivers reducing agent to injector 220. In operation, the reducing agent is injected onto SCR filter 206, and exhaust 118 passes through the SCR filter. As exhaust 118 passes through, the NOx reacts with the reducing agent and reduces NOx to nitrogen, water and carbon dioxide, which then may be exhausted to atmosphere or otherwise used for heat recovery in a conventional manner downstream of ER system 200.

ER system 200 may also include a flow distributor 224 prior to emission filter 202 to distribute the exhaust flow properly and avoid exhaust flow bypass, which may be an issue during startup or low load conditions as the flow coming into ER system 200 is approximately 5-20% of the design flow and the exhaust velocity profile may not be uniform. Flow distributor 224 may include a perforated disc or some other design to distribute the flow properly, e.g., uniformly. Such flow distributor 224 is only shown relative to FIG. 3 for clarity, but it can also be part of any ER system arrangement described herein.

Figure 4:
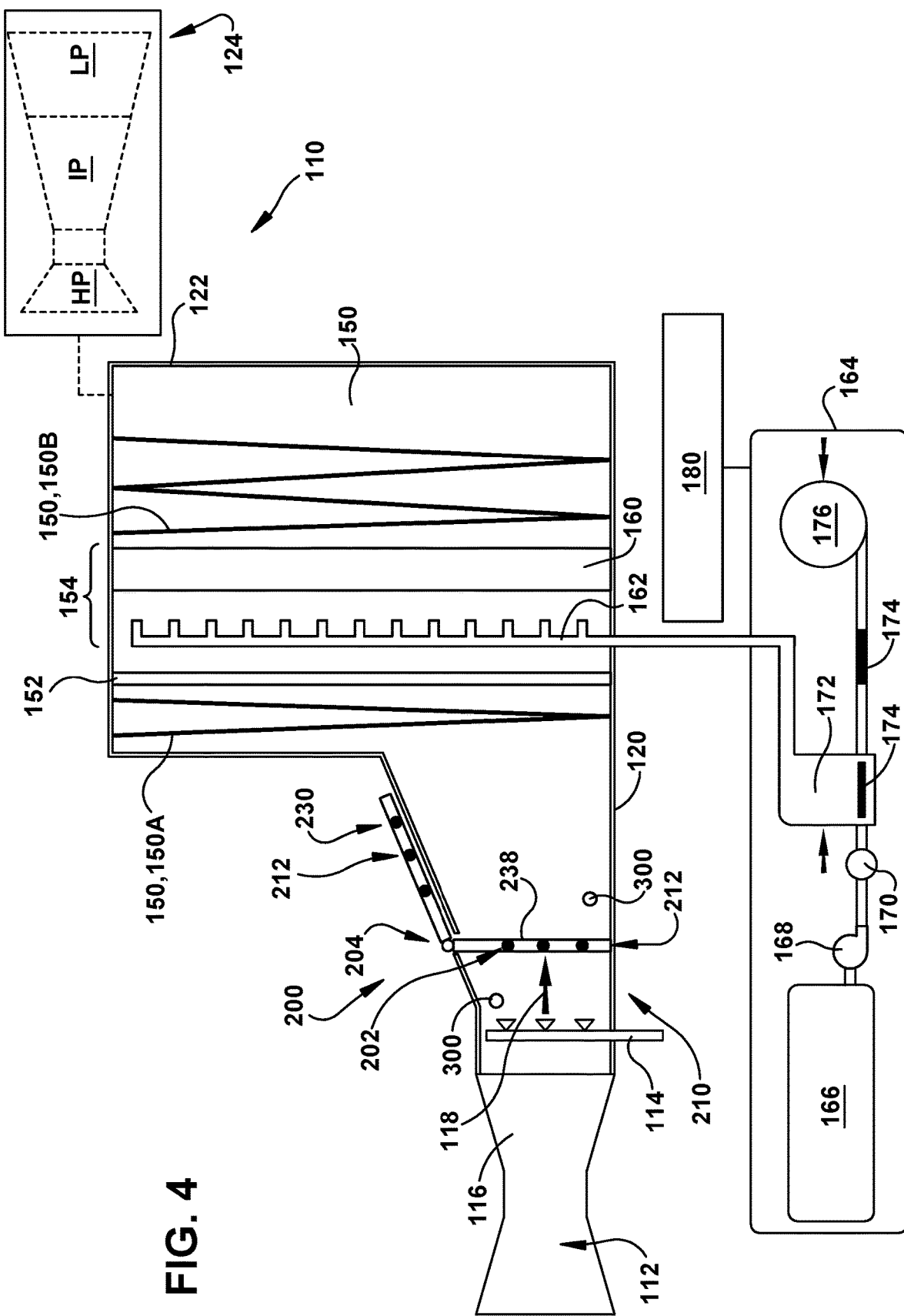
FIG. 4 shows a cross-sectional view of part of an emission reduction system according to an embodiment of the disclosure.

In another embodiment, shown in FIG. 4, emission filter 202 may take the form of a carbon monoxide (CO) catalyst filter 238 through which exhaust 118 passes to remove carbon monoxide (CO) from exhaust 118 of gas turbine 116. As illustrated, CO catalyst filter 238 is positioned upstream of HRSG 122, which is operably coupled to exhaust passage 120 of gas turbine 116 for generating steam for a steam turbine. CO catalyst filter 152 may include any now known or later developed CO catalytic material capable of carrying out the desired catalytic conversion of CO to carbon dioxide ($CO_2$) or other less toxic pollutants in a conventional manner. In one example, CO catalyst filter 238 may include a ceramic monolith (e.g., FeCrAl) in a honeycomb arrangement coated with: a washcoat including, for example, aluminum oxide, titanium dioxide, silicon dioxide, and/or silica with alumina, etc.; ceria or ceria-zirconia; and a catalyst such as but not limited to platinum, palladium, rhodium, cerium, iron, manganese and/or nickel. CO catalyst filter 238 can be a two-way or a three-way converter. In operation, exhaust 118 passes through CO catalyst filter 238 in which carbon monoxide is converted to carbon dioxide in a conventional manner. Exhaust 118 may then be exhausted to atmosphere or otherwise used for heat recovery in a conventional manner downstream of ER system 200.

In another embodiment, shown in FIG. 3, emission filter 202 may take the form of a combined SCR/CO catalyst filter 242. In this embodiment, emission filter 202 includes both SCR filter layers and CO catalyst filter layers, and is functional to remove both NOx and CO. As will be described herein (FIG. 9), in other embodiments, both an SCR system 210 and a CO catalyst filter 238 may be provided upstream of HRSG 122.

Continuing with FIGS. 3 and 4, retraction system 204 is operably coupled to exhaust passage 120 of gas turbine 116, and is operable to selectively move emission filter 202 between first location 212 within the exhaust path and a second location 230 out of the exhaust path. In this fashion, as will be described in greater detail herein, ER system 200 can temporarily position emission filter 202 just downstream of gas turbine 116 exhaust outlet and/or upstream of HRSG 122, for emission reduction at low loads or startup conditions, and remove the emission filter 202 once operations move to higher loads and/or when the exhaust temperature exceeds the design temperature of emission filter 202 (e.g., the temperature range for an illustrative SCR catalyst may be 176° C. to 398° C. (i.e., 350° F.-750° F.), with some SCR materials capable of use up to 480° C. (i.e., approximately 900° F.) and in extreme cases up to 537° C. (i.e., ~1000° F.)). The second location 230, as will be described, can be within exhaust passage 120 or outside of exhaust passage 120, but is in either event, outside of the exhaust path.

Emission filter 202 and retraction system 204 can take a variety of different forms.

Figure 5:
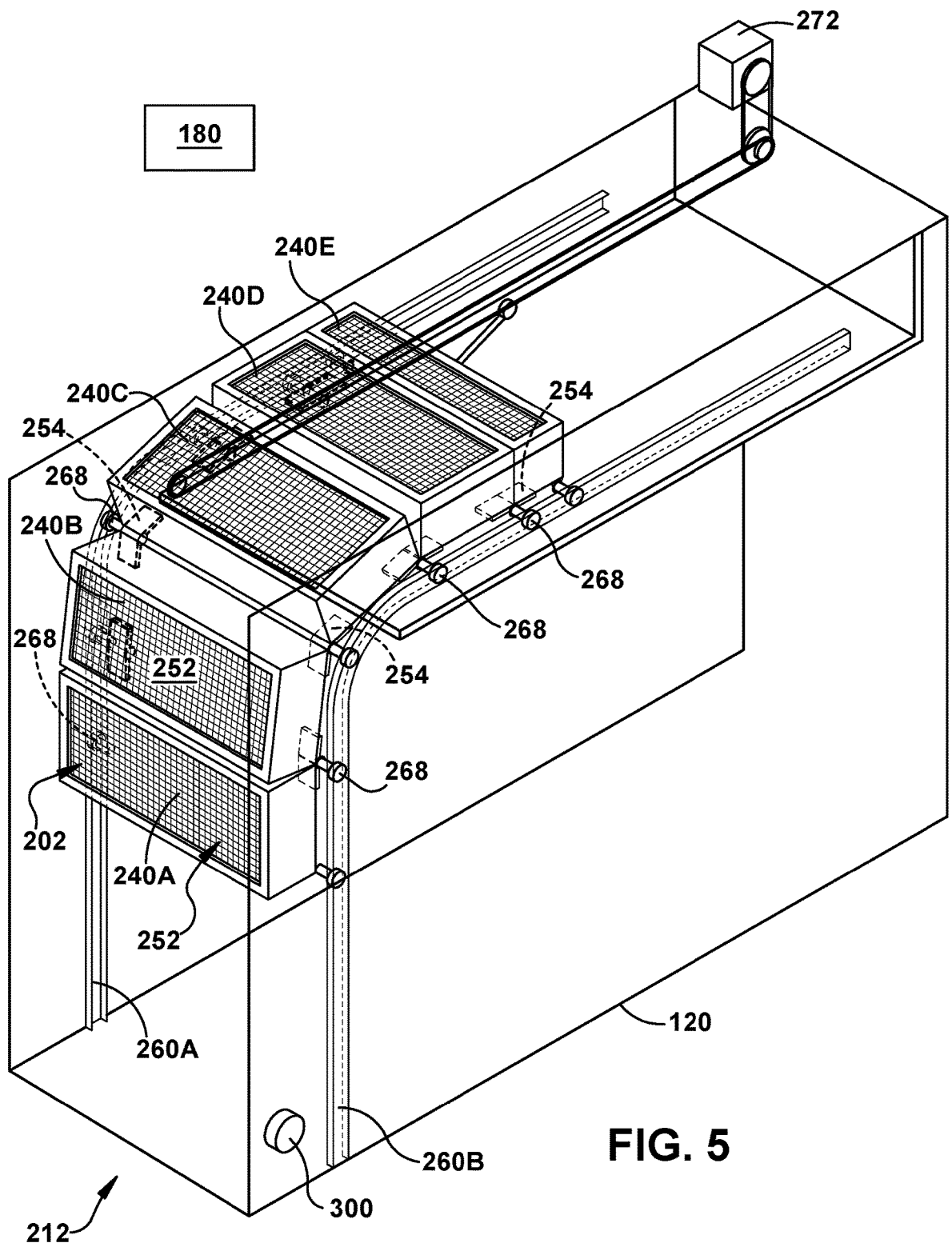
FIG. 5 shows a perspective view of an emission filter and retraction system according to an embodiment of the disclosure.
Figure 6:
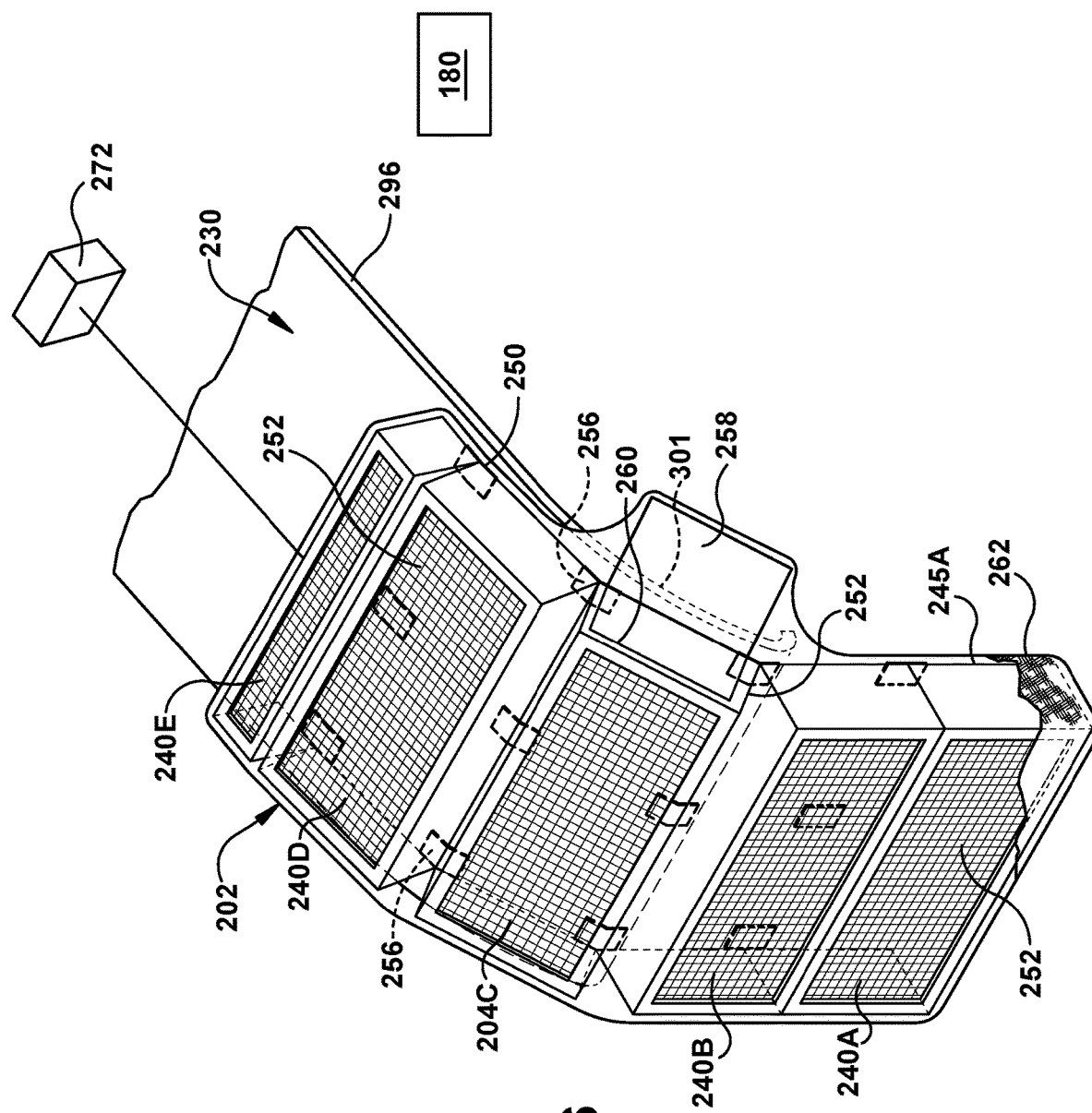
FIG. 6 shows a perspective view of an emission filter and retraction system according to another embodiment of the disclosure.
Figure 7:
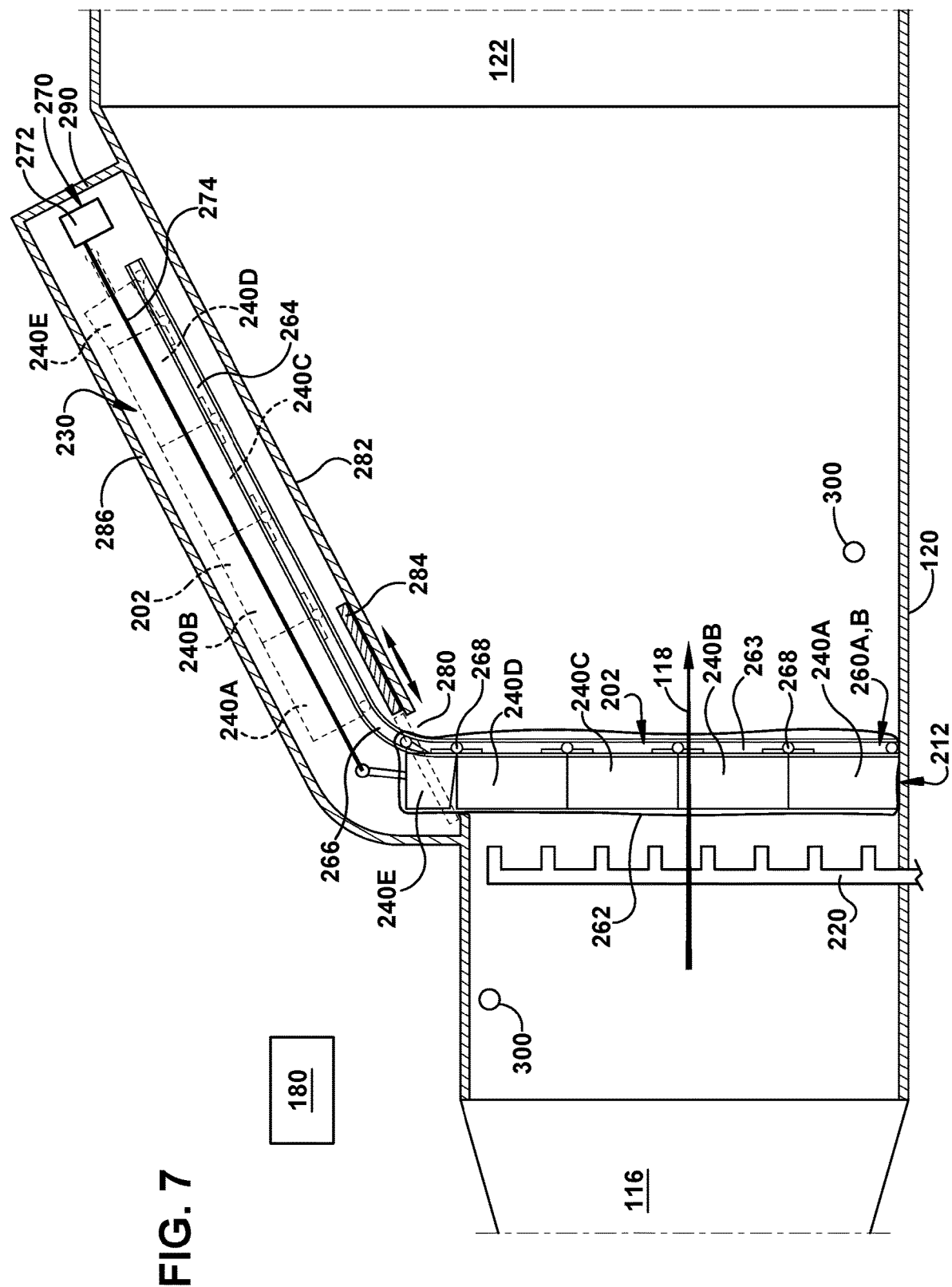
FIG. 7 shows a cross-sectional view of part of an emission reduction system according to an embodiment of the disclosure.
Figure 8:
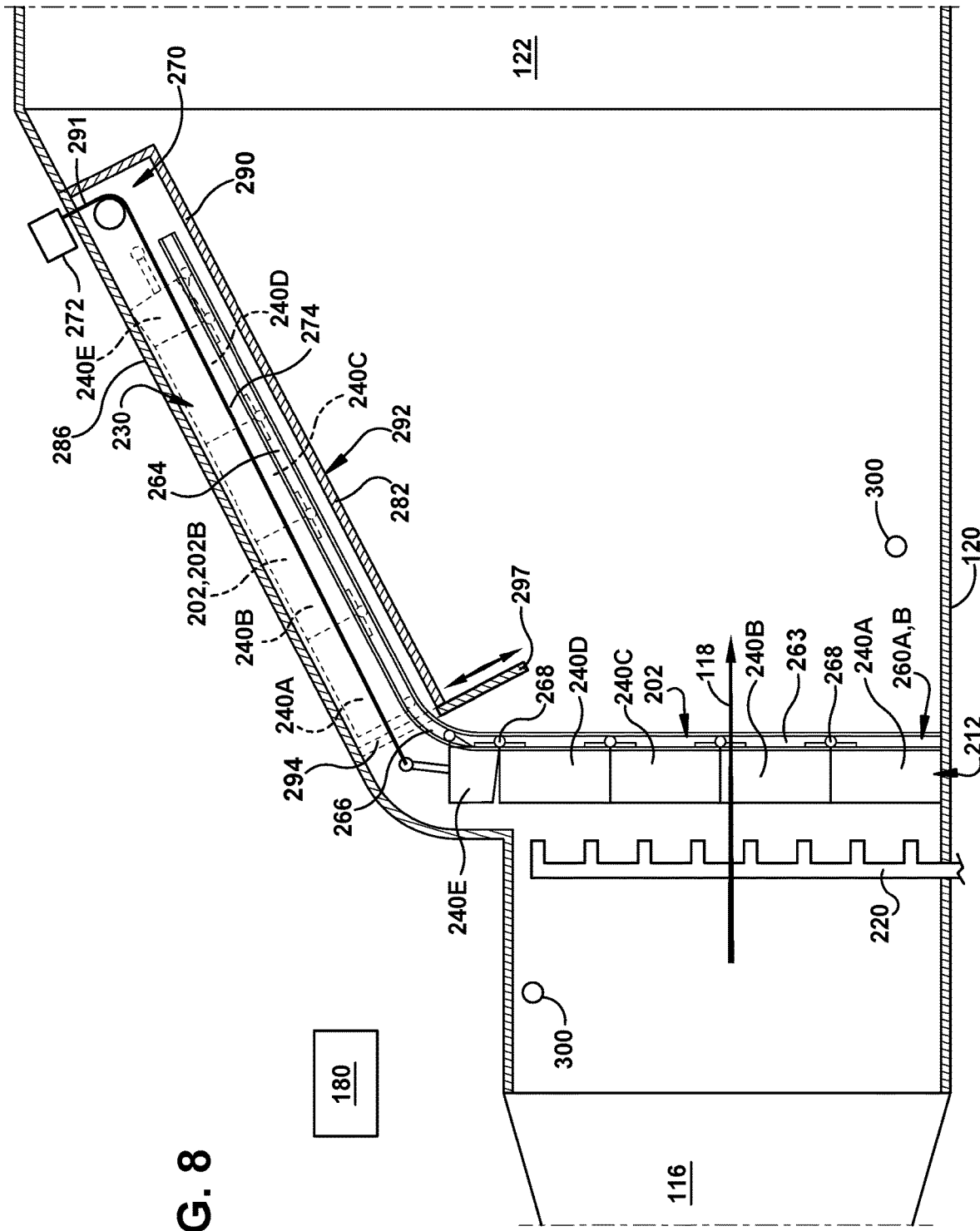
FIG. 8 shows a cross-sectional view of part of an emission reduction system according to another embodiment of the disclosure.

In the FIG. 3 embodiment, and as better illustrated in FIGS. 5-8, emission filter 202 may include a series of pivotally coupled panels 240A-E. Any number of panels 240 may be employed in this fashion, e.g., 2, 3, 4 . . . 10, etc. In this embodiment, emission filter 202 may resemble a vertically retractable garage door. As shown best in FIGS. 5-6, in one embodiment, each panel 240A-E may include an open structure frame 250 (FIG. 6) having a filter medium 252 (FIG. 5) therein through which exhaust 118 passes. Open structure frame 250 may have any shape or size desirable for the particular gas turbine 116 to which attached and particular toxin to be removed. Filter medium 252 may include any filter material as appropriate for the type of toxin to be removed, e.g., a carbon monoxide (CO) catalyst filter and/or an SCR filter. Each panel 240A-E may have any requisite thickness for the desired emission reduction being carried out thereby. In one example, each panel 240A-E has a thickness of less than 0.6 meters. In one embodiment, shown in FIG. 5, each panel 240A-E is pivotally coupled to at least one adjacent panel by hinges 254. Hinges 254 may take the form of any hinge capable of withstanding the environmental conditions within exhaust passage 120 and structurally pivotally supporting panels 240A-E. Any number of hinges 254, e.g., 1, 2, 3, etc., necessary may be employed between pairs of panels 240A-E. In other embodiments, other mechanisms for pivotally coupling panels 240A-E may be employed including but not limited to: lengths of looped material 256 (FIG. 6) such as metal cable, chains, etc.; and arced members (not shown) extending from one panel and seating in an adjacent panel. Open structure frame 250 may be made of any material capable of providing structural support and withstanding the environmental conditions within exhaust passage 120, e.g., high thermal resistance metal or metal alloys. As shown in FIG. 6 only, each open structure frame 250 may include a movable closure 258 selectively closing an access opening 260 to an interior of frame 250, and allowing access to the access opening. Movable closure 258 may take the form of any sort of movable closure such as but not limited to: a pivoting door (shown), slide door, and a bolted on cover. Each filter medium 252 may be replaceable, and may be replaced through access opening 260. It is noted that in FIG. 6, emission filter 202 is shown in a curved, expanded arrangement to illustrate its components' size and shape. In operation, as shown in FIGS. 7-8, panels 240A-E may stack vertically so as to form a filter wall through which exhaust 118 must pass to move downstream in exhaust passage 120.

As also shown in FIG. 6, a flexible mesh 262 may cover at least a portion of an exterior of panels 240A-C to protect filter medium 252 therein. Flexible mesh 262 can be any form of mesh that exhaust can pass through but will protect filter medium 252, e.g., flexible metal screening, chainmail, etc. Flexible mesh 262 must also be able to withstand the environmental conditions within exhaust passage 120. Flexible mesh 262 may cover panels 260A-C collectively or individually, and is preferably replaceable.

In one embodiment, shown in FIGS. 5, 7 and 8, each panel 240A-E may have a pair of opposing bearings 268 extending from opposing ends of the respective panel. In this case, retraction system 204 may include a pair of bearing tracks 260A, 260B configured to receive a bearing 268 of a selected opposing end of pair of opposing bearings of panels 240A-E. That is, bearing 268 is configured to mate with a track system 260A, 260B, which in turn direct positioning of emission filter 202. As shown in FIGS. 7 and 8, pair of bearing tracks 260A, 260B each include a first portion 263 arranged to position emission filter 202 at first location 212 in exhaust passage 120 in response to bearings 268 being in first portion 263. Further, pair of bearing tracks 260A, 260B each include a second portion 264 arranged to position emission filter 202 at second location 230 in response to bearings 268 being in second portion 264. Also, pair of bearing tracks 260A, 260B each include a transition portion 266 coupling first portion 263 and second portion 264. In this fashion, as bearings 268 move along tracks 260A, 260B, emission filter 202 can be moved from first location 212 to second location 230. Bearing tracks 260A, 260B can take any form capable of receiving and/or holding bearings 268, e.g., L-shaped, U-shaped, U-shaped with rounded ends, etc.

An actuator 270 is configured to move emission filter 202 along pair of bearing tracks 260A, 260B. Actuator 270 may include any form of motorized system capable of moving emission filter 202 along tracks 260A, 260B. In one example, actuator 270 may include an electric, hydraulic or pneumatic motor 272 coupled to an uppermost panel 240D of emission filter 202 by a transmission linkage 274 (e.g., a chain, cable, etc.). Transmission linkage 274 may take a variety of forms such as but not limited to: a length of material reeled onto/off of a reel coupled to motor 372, a band of chain positioned about a pair of gears, one coupled to motor 272, and coupled to emission filter 202. Activation of motor 272 in one direction moves emission filter 202 from first location 212 to second location 230, and activation of motor 272 in the opposite direction moves emission filter 202 from second location 230 to first location 212. In FIGS. 7 and 8, motor 272 of actuator 270 may be within filter enclosure 290 (FIG. 7) or outside of exhaust passage 120 and filter enclosure 290 (FIG. 8). When outside of filter enclosure 290, any form of transmission 291 (FIG. 8), e.g., a drive shaft, gear box, drive chain, etc., can extend into enclosure 290, as necessary. The above-described retraction system 204 may be varied in a wide variety of ways including but not limited to: more or less tracks, different transmission, different actuator motor, etc. As will be described further, actuator 270 is controlled by controller 180.

In one embodiment, shown in FIG. 7, second location 230 is outside of exhaust passage 120. In this case, exhaust passage 120 may include an opening 280 configured to permit movement of emission filter 202 therethrough to an outside of exhaust passage 120. Opening 280 may be provided, for example, within a wall 282 of exhaust passage 120. In the example shown, wall 282 includes an upper wall of exhaust passage 120, but it may be any wall of exhaust passage 120. Opening 280 may be configured to be selectively openable or closable with an automated closure 284, e.g., a pivoting door, slidable door, etc., under control of controller 180. In addition, opening 280 may be configured to allow tracks 260A, 260B to pass therethrough. When opening 280 is open, emission filter 202 may pass therethrough, and when closed, emission filter 202 cannot pass therethrough and exhaust passage 120 is closed to the environment. Any form of atmospheric enclosure 286 may be provided to close off exhaust passage 120 from the outside environment when opening 280 is open.

Some emission filters 202, e.g., SCR filters, should not be exposed to atmosphere or environments that expose them to substances that may negatively impact their ability to function, e.g., dust, high or low moisture and/or other atmospheric conditions. To this end, as shown in FIG. 7, an emission filter enclosure 290 may be provided outside exhaust passage 120. In this case, in second location 230, emission filter 202 is positioned within emission filter enclosure 290. Emission filter enclosure 290 can include any form of compartment capable of preventing exposure of emission filter 202 to the undesired conditions, e.g., dust, moisture, etc. Emission filter enclosure 290 can be, for example, a hard surfaced box, e.g., plastic or metal; a flexible compartment, e.g., bag. While shown positioned against wall 282 of exhaust passage 120, enclosure 290 can be spaced from exhaust passage 120.

In another embodiment, shown in FIG. 8, second location 230 is inside of exhaust passage 120, but outside of the exhaust path. In this case, tracks 260A, 260B provide second location 230 at a position outside of the exhaust path but still within exhaust passage 120. Although inside of exhaust passage 120, some emission filters 202 should not be exposed to the higher load conditions of exhaust 118, e.g., higher temperatures, etc. To this end, as shown in FIG. 8, an emission filter enclosure 292 may be provided inside exhaust passage 120. In second location 230 in FIG. 8, emission filter 202 is positioned within emission filter enclosure 292 inside exhaust passage 120. Emission filter enclosure 292 can include any form of compartment capable of preventing exposure of emission filter 202 to the undesired conditions, e.g., high temperatures, within exhaust passage 120. Emission filter enclosure 292 can be, for example, a hard surfaced box, e.g., metal. While shown positioned against wall 282 of exhaust passage 120, enclosure 292 can be spaced from any wall of exhaust passage 120. To protect emission filter 202 during higher load conditions, emission filter enclosure 292 may include a closable opening 294 configured to permit movement of emission filter 202 therethrough when open. Opening 294 may be configured to be selectively openable or closable with an automated closure 297, e.g., a pivoting door, slidable door, etc., under control of controller 180. In addition, opening 294 may be configured to allow tracks 260A, 260B to pass therethrough. When opening 294 is open, emission filter 202 may pass therethrough, and when closed, emission filter 202 cannot pass therethrough and is, when inside of enclosure 292, protected from conditions within exhaust passage 120. In this embodiment, motor 272 of actuator 270 may be within or, as shown in, outside of exhaust passage 120 and filter enclosure 292. When outside of exhaust passage 120, any form of transmission 291, e.g., a drive shaft, gear box, drive chain, etc., can extend into enclosure 292, as necessary.

Figure 9:
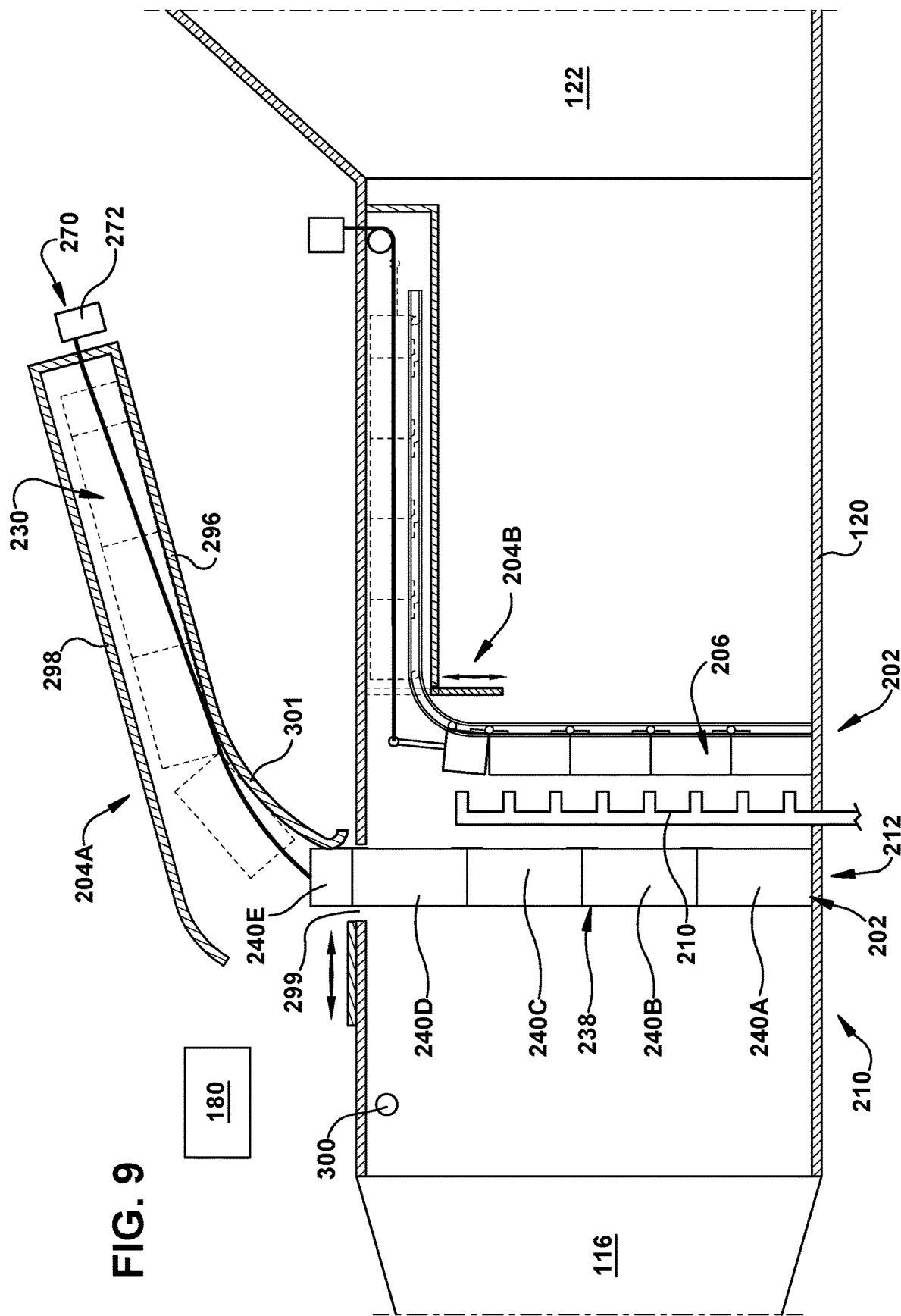
FIG. 9 shows a cross-sectional view of part of an emission reduction system according to an embodiment of the disclosure.

With reference to FIGS. 6 and 9, in another embodiment, a retraction system 204A may include an actuator 270 as in previously-described embodiments, but rather than a track system 260A, 260B, a ramp 296 capable of directing emission filter 202 to second location 230 is provided. Ramp 296 may be formed as a single planar element that also functions as an enclosure 298. Ramp 296 and actuator 270 may be outside of exhaust passage 120. A selectively openable opening 299 may be provided in exhaust passage 120 to allow for selective movement of emission filter 202 between first location 212 and second location 230 (in phantom). Ramp 296 includes a curved portion 301 allowing for dropping of panels 240A-E of emission filter 202 to first location 212 in a stacked manner. Any form of guide elements (not shown) necessary to ensure proper positioning and movement of emission filter 202 may be applied.

FIG. 9 also shows an optional embodiment in which emission filter 202 includes an SCR system 210 including an SCR filter 206 and a carbon monoxide (CO) catalyst filter 238 upstream of SCR filter 206. Both SCR filter 206 and CO catalyst filter 238 are upstream of HRSG 122. Both SCR filter 206 and CO catalyst filter 238 can be retractably mounted to their own respective retraction system 204A, 204B. Retraction system 204B can take any form described herein. In the example shown, retraction system 204B is similar to retraction system 204 in FIG. 8, inside of exhaust passage 120.

Figure 10:
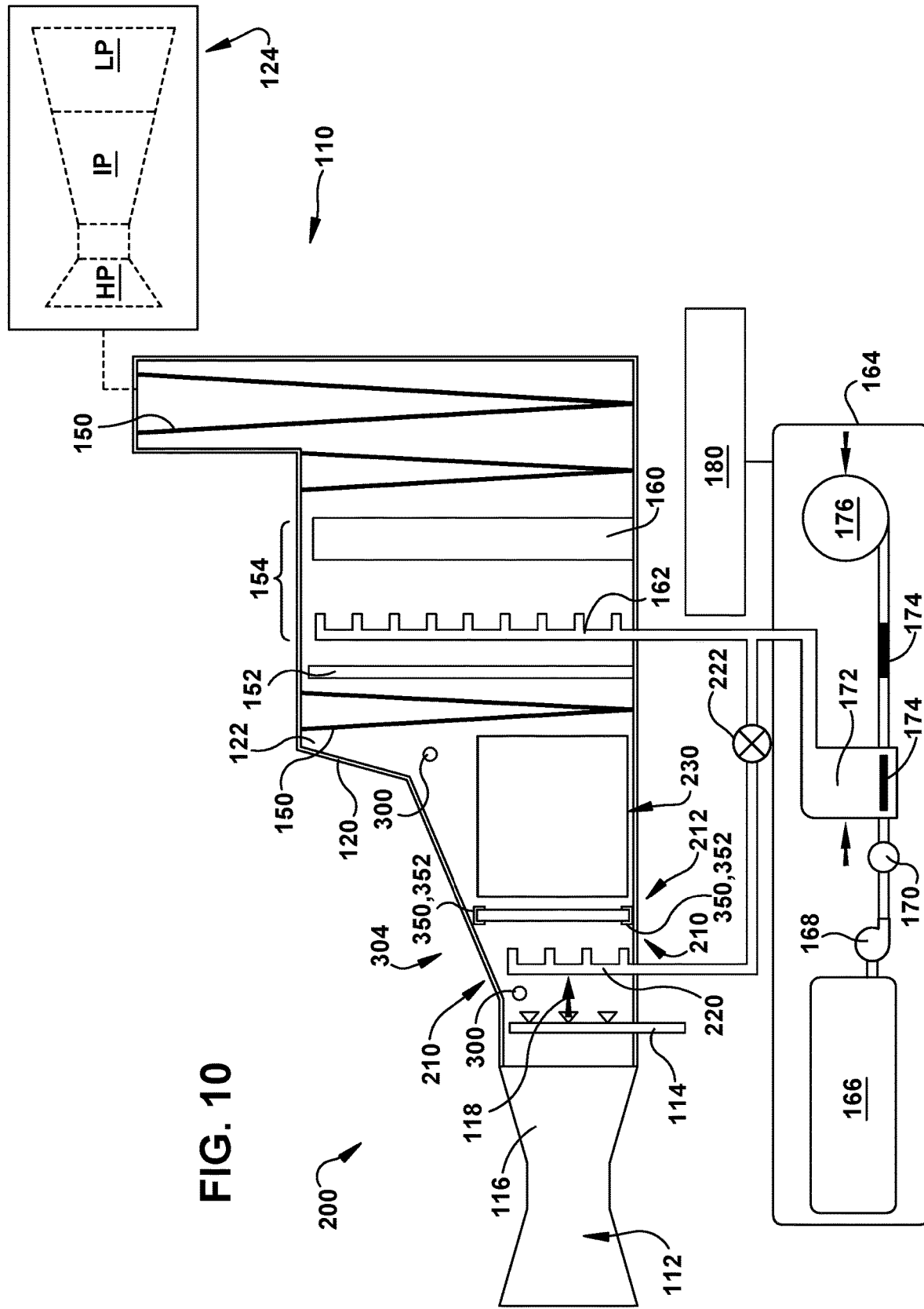
FIG. 10 shows a cross-sectional view of part of an emission reduction system according to an embodiment of the disclosure.
Figure 11:
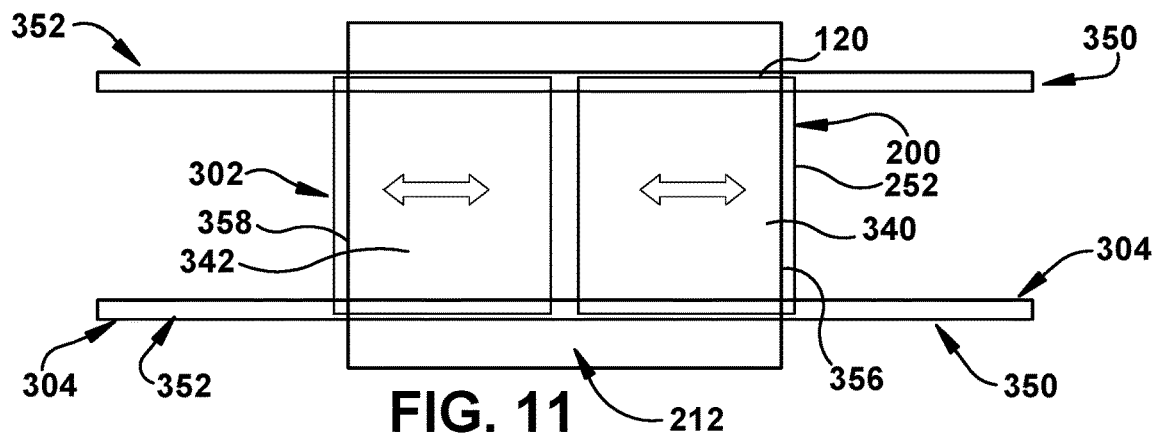
FIG. 11 shows a schematic, perspective view of part of an emission reduction system according to an embodiment of the disclosure.

Referring to FIGS. 10-14, in another embodiment, ER system 200 for power plant 110 including gas turbine 116 may include an emission filter 302 including a first panel 340 and a second panel 342. Panels 340, 342 may each include an SCR filter for SCR system 210, as shown in FIG. 10, a CO catalyst filter (like in FIG. 6) or a combination SCR and CO filter. In this embodiment, panels 340, 342 slide in from a side of exhaust passage 120 rather than on a vertically oriented track as in FIGS. 3-9. Each panel 340, 342 may be constructed similarly to panels 240A-E (FIG. 6), and may include an open structure frame 250 having filter medium 252 therein through which exhaust 118 passes to remove an exhaust component of the exhaust of gas turbine 116. In contrast to pivotally coupled panels 240A-E, each panel 340, 342 are moved laterally into place and are sized so as to cover a large portion of the cross-section of exhaust passage 120. As shown in FIG. 11, each panel 340, 342 may take up, for example, 50% of the cross-sectional area of exhaust passage 120, but in any event collectively cover the cross-sectional area so as to cross the exhaust path. Each panel 340, 342 may have any thickness (along exhaust path) necessary to provide the desired emission reduction, e.g., less than 0.6 m thick.

Figure 12:
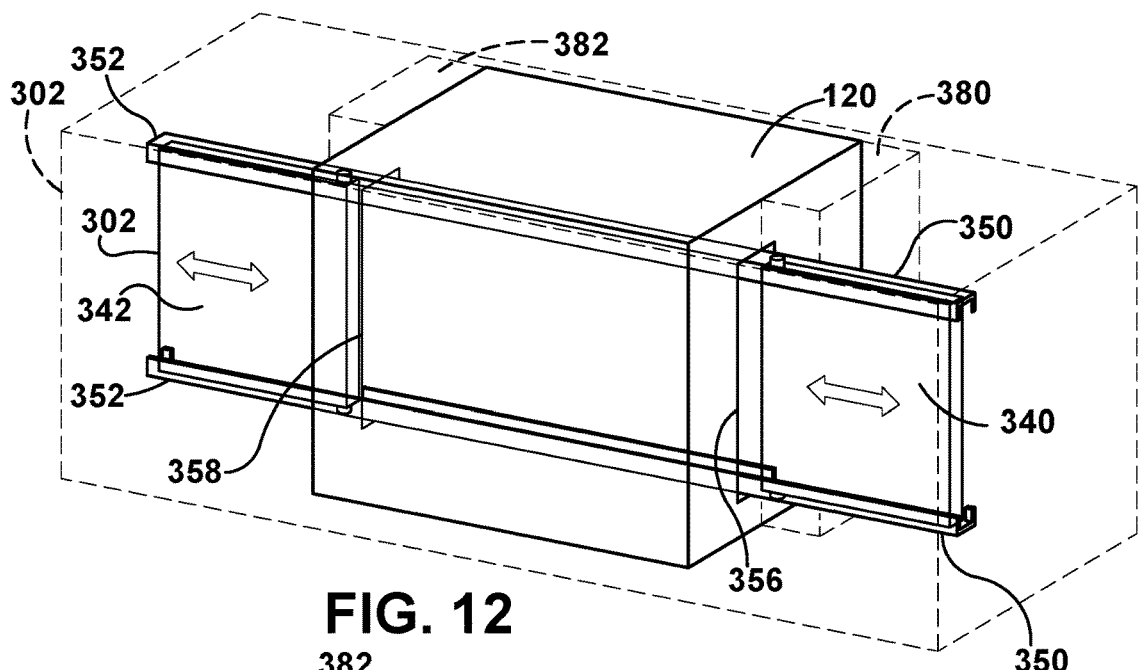
FIG. 12 shows a schematic, perspective view of part of an emission reduction system according to an embodiment of the disclosure.
Figure 13:
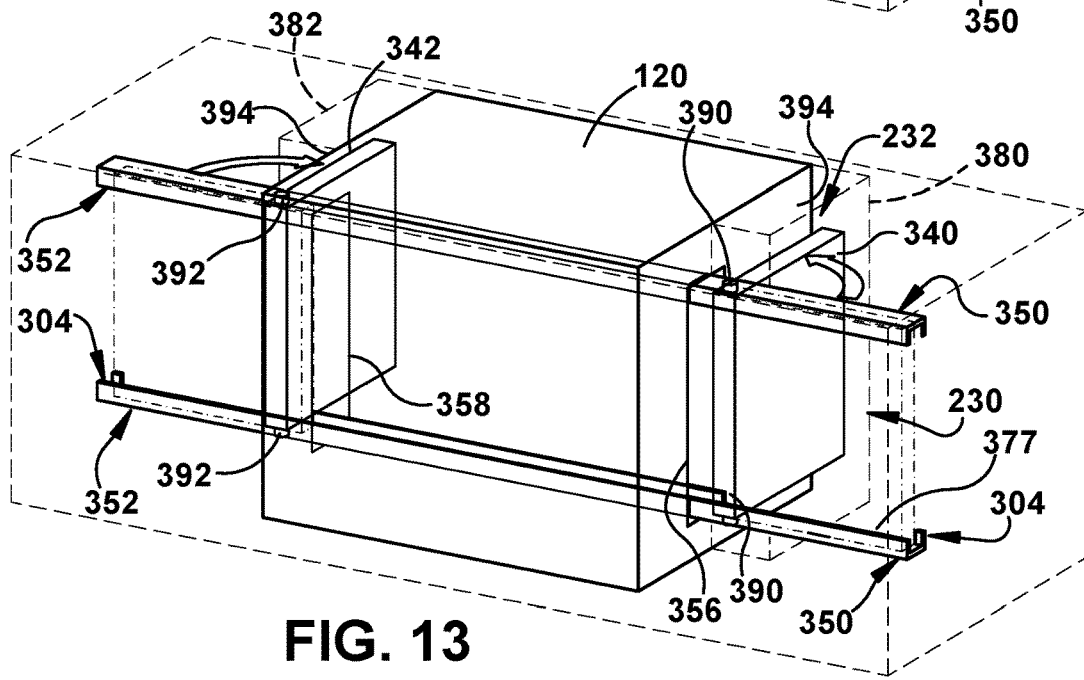
FIG. 13 shows a schematic, perspective view of part of an emission reduction system according to an embodiment of the disclosure.
Figure 14:
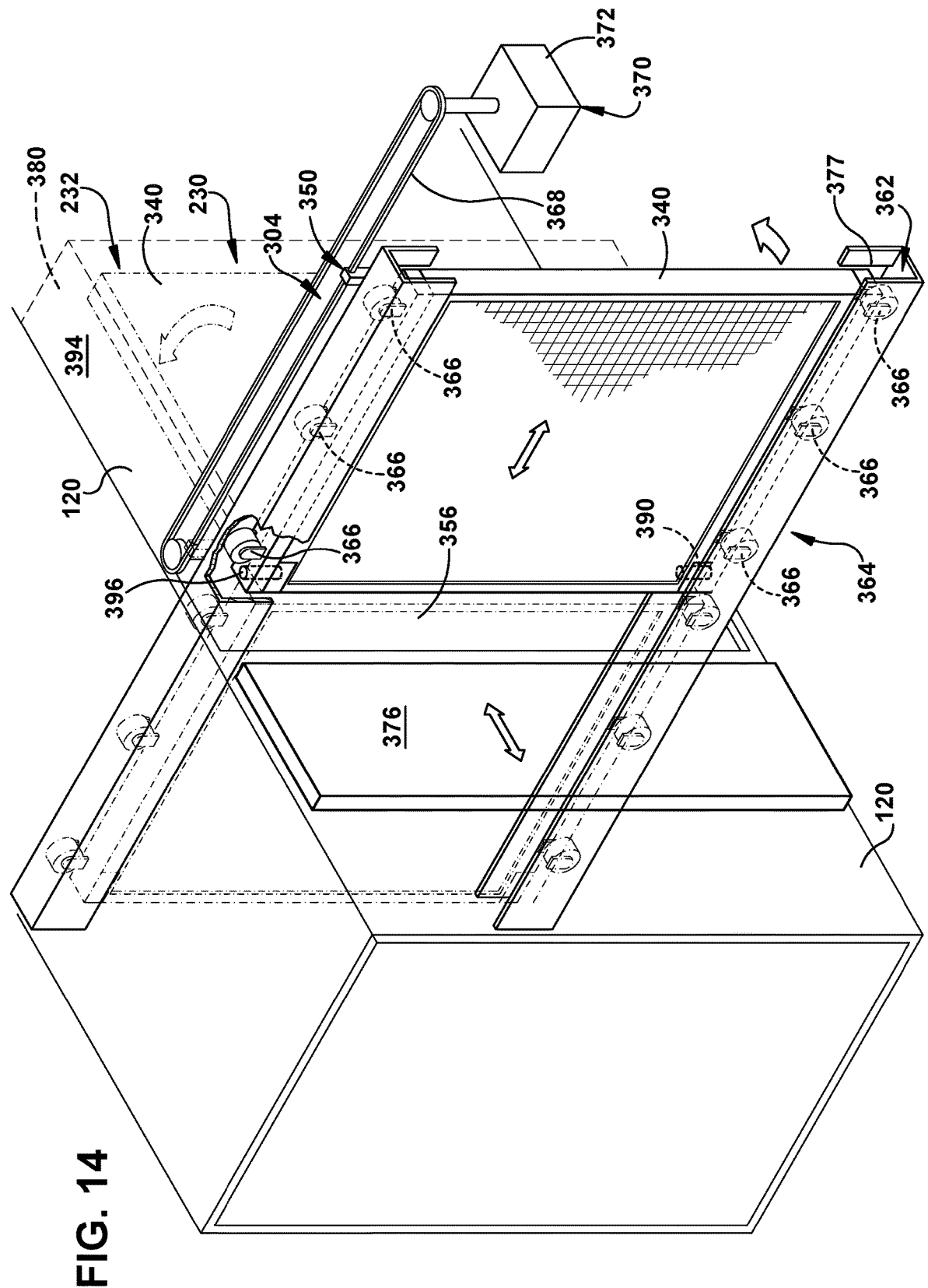
FIG. 14 shows a perspective view of a retraction system according to an embodiment of the disclosure.

A retraction system 304 is operably coupled to exhaust passage 120 of gas turbine 116 to move panels 340, 342. In this embodiment, retraction system 304 may selectively laterally move each of first and second panels 340, 342 between first location 212 within the exhaust path within exhaust passage 120 and a second location 230 out of the exhaust path, e.g., under control of controller 180. Retraction system 304 may include any variety of structures capable of laterally moving panels 340, 342 between first location 212 and second location 230 in an automated fashion. In one embodiment, shown in FIGS. 11-13, retraction system 304 may include a first and second bearing track 350, 352 configured to guide movement of panels 340, 342. First bearing track 350 extends laterally from within exhaust passage 120 through a first side opening 356 in exhaust passage 120, and is configured to receive (e.g., sized and shaped) first panel 340 to allow lateral movement of the panel therein. As shown in FIG. 14, first side opening 356 is configured (e.g., sized and shaped) to permit movement of first panel 340 therethrough. Similarly, as shown in FIGS. 11-13, second bearing track 352 extends laterally from within exhaust passage 120 through a second side opening 358 in exhaust passage 120, and is configured to receive second panel 342 to allow lateral movement of the pane therein. Second side opening 358 (FIG. 11) is configured to permit movement of the second panel therethrough, similarly to opening 356 in FIG. 14.

As best illustrated in FIG. 14 for bearing track 350, in the embodiment shown, each bearing track 350 (and 352 in FIGS. 11-13) may include a pair of vertically spaced track elements 360, 362 (FIG. 14 only) that extend laterally into exhaust passage 120 to allow movement of a respective panel, e.g., 340, therealong between first location 212 (FIG. 11) and second location 230. Each track element 360, 362 extending from one side of exhaust passage 120 may be integral with its corresponding track element extending from the other side of exhaust passage 120 (for 352 in FIGS. 11-13), so each upper and lower track elements 360, 362 are one piece. However, they may also be four separate track elements. In the example shown, track elements 360, 362 include U-shaped elements, but any element capable of laterally guiding a respective panel may be provided. In the example shown, each panel 340, 342 may include one or more bearings 364 for engaging a respective bearing track 350, 352, and, more particularly, engaging a respective track element 360, 362, for allowing the panels to move laterally guided by track elements 360, 362. In one example, as shown in in FIG. 14, bearings 364 may include a plurality of wheels 366 for rolling engagement with each track element 360, 362 (like heavy sliding glass doors). Other bearing mechanisms for allowing movement may also be provided such as skids or rolling tracks. In another embodiment, a bearing 364 may be provided on only the top or bottom of a respective panel. For example, bearing 364 may include slide or roller bearings engaging a horizontal track on an upper track element 360 with no load-carrying bearings provided for the lower track element, or non-load-carrying bearings may be provided on the lower track element 362 for guidance only (like a glass shower door or sliding hanging closet doors).

Figure 18:
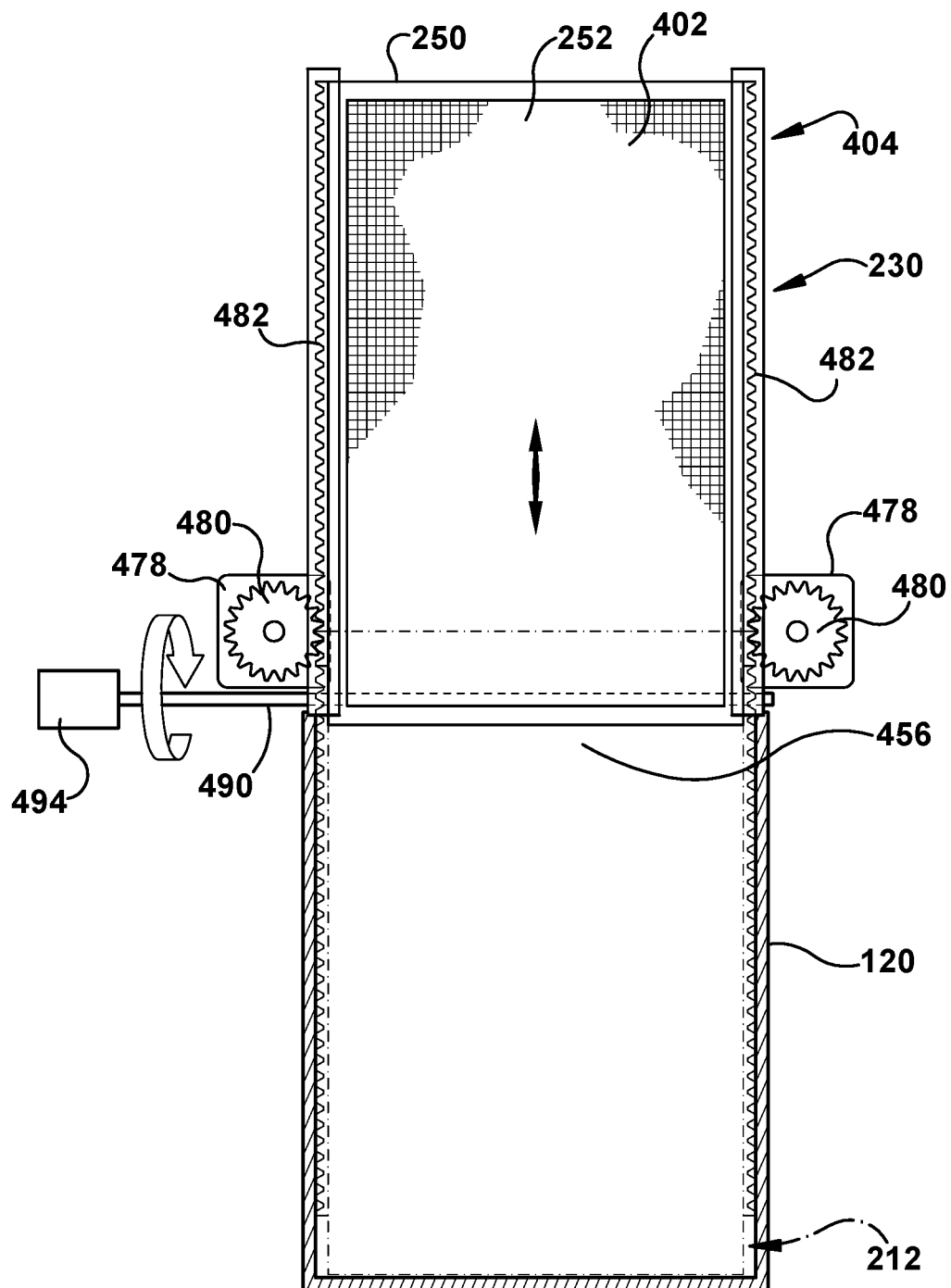
FIG. 18 shows a cross-sectional view of a retraction system according to another embodiment of the disclosure.
Figure 19:
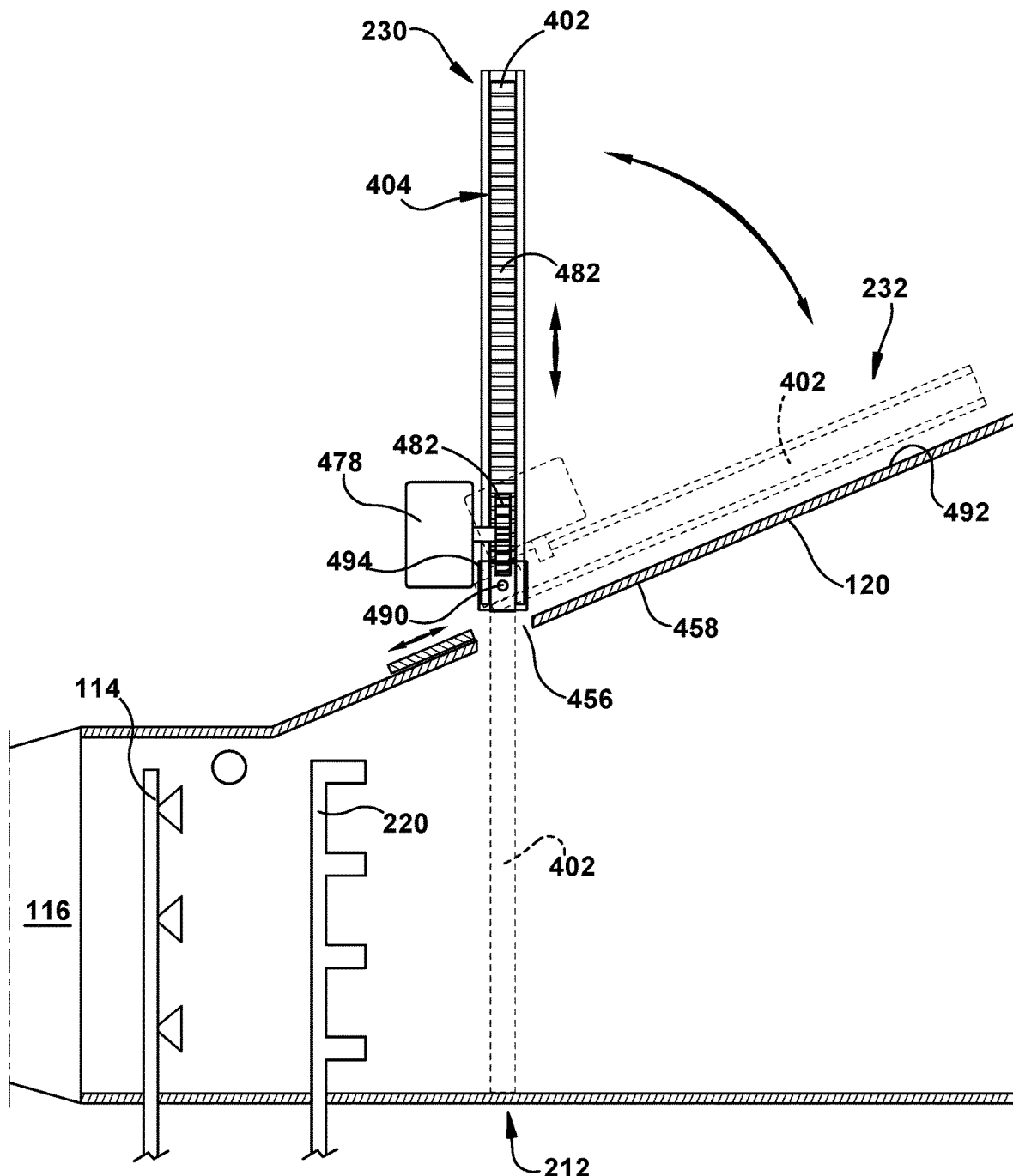
FIG. 19 shows a cross-sectional view of part of an emission reduction system according to an embodiment of the disclosure.

ER system 200 may also include an actuator 370 configured to move each of the first and second panels 340, 342 between first location 212 within the exhaust path within exhaust passage 120 and second location 230 laterally outside of the exhaust passage. Actuator 370 can take a variety of forms. In one embodiment, shown best in FIG. 14, actuator 370 may include a linkage 368 to a motor 372 that forces movement of panels 340, 342 along track elements 360 and/or 362, e.g., such as a loop of chain movable by motor 372 and coupled to panel 340 or 342. There are a large variety of actuators capable of providing this sort of movement, all of which are considered within the scope of the disclosure. In one embodiment, shown in FIG. 14, actuator 370 is similar to a garage door actuator, e.g., a motor under control of controller 180 and a chain configured to move panels 340, 342 along track element(s) 360, 362; or a motor having a rotating gear that meshes with a pinion gear on the panels 340, 342 (see FIGS. 18-19); etc. More than one motor may be employed, e.g., one on each side of exhaust passage 120, as may be necessary.

As shown best in FIG. 14, side opening 356 (and side opening 358 in FIGS. 11-13) may include a closure 376 therefor. Closures 376 may include any form of automated closing element, e.g., a sliding closure, pivoting door, etc., controllable by controller 180 and capable of sealing exhaust passage 120 from outside when emission filter 302 is not in use.

As shown in FIG. 14, in one optional embodiment, ER system 200 may further include a first panel enclosure 380 configured to receive first panel 340 in second location 230. As shown, first panel enclosure 380 couples to exhaust passage 120 and covers first side opening 356. As shown in FIG. 12, a second panel enclosure 382 is configured to receive second panel 342 in second location 230. Second panel enclosure 382 is coupled to exhaust passage 120 and covers second side opening 358 (FIG. 11). Each enclosure 380, 382 may include a closure for closing an opening therein through which a respective panel enters the enclosure. In the example in FIG. 14, closure 376 may provide dual purpose of closing side openings 356, 358 (FIG. 11) of exhaust passage 120 and closing enclosure(s) 380, 382. Alternatively, each enclosure 380, 382 may include its own dedicated automated closure.

Referring to FIGS. 13 and 14, ER system 200 may also include a first pivot element 390 coupled to first panel 340 and a second pivot element 392 coupled to second panel 342, e.g., between panels 340, 342 and respective bearings 364. Each pivot element 390, 392 may permit pivoting of a respective panel from second location 230 to a storage location 232 adjacent an exterior side 394 of exhaust passage 120. Track elements 360, 362 may include cutouts 377 or other mechanisms for allowing pivoting movement of a respective panel to storage location 232 away from track elements 360, 362. In this fashion, each panel 340, 342 can be laterally moved out of exhaust passage 120 and out of the way adjacent to exhaust passage 120, lowering the size of the footprint of ER system 200. Any form of motorization to power the pivoting can be provided. In one embodiment, shown in FIG. 14, panel enclosures 380, 382 (FIG. 12) may be configured to receive a respective panel 340, 342 and be movable to storage location 232 therewith. In this case, pivot elements 390 for panels 340, 342 may be omitted, and each enclosure 380, 382 may include a pivot element 396 allowing collectively pivoting of the enclosure and panel therein to storage location 232.

Figure 15:
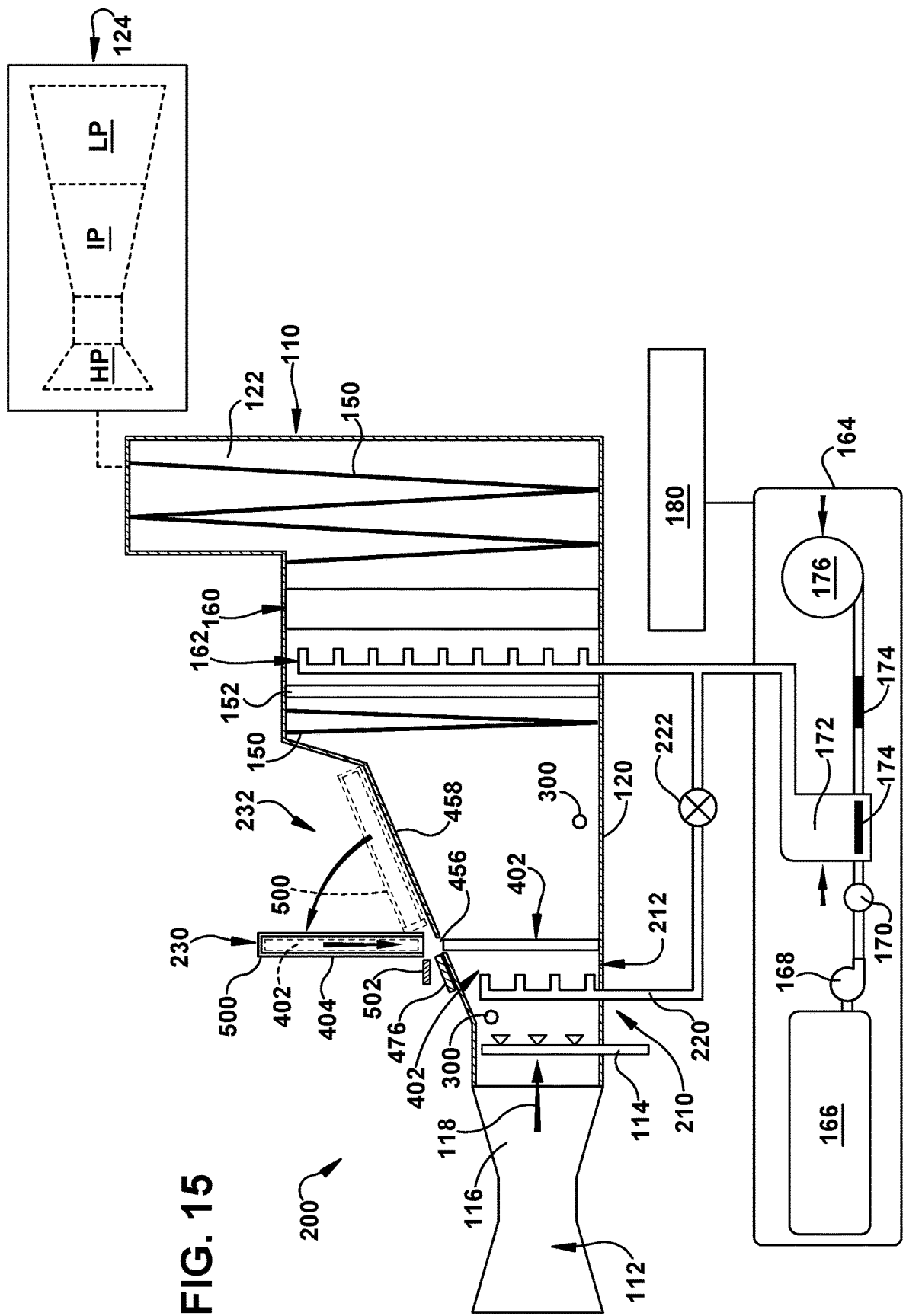
FIG. 15 shows a cross-sectional view of part of an emission reduction system according to an embodiment of the disclosure.
Figure 16:
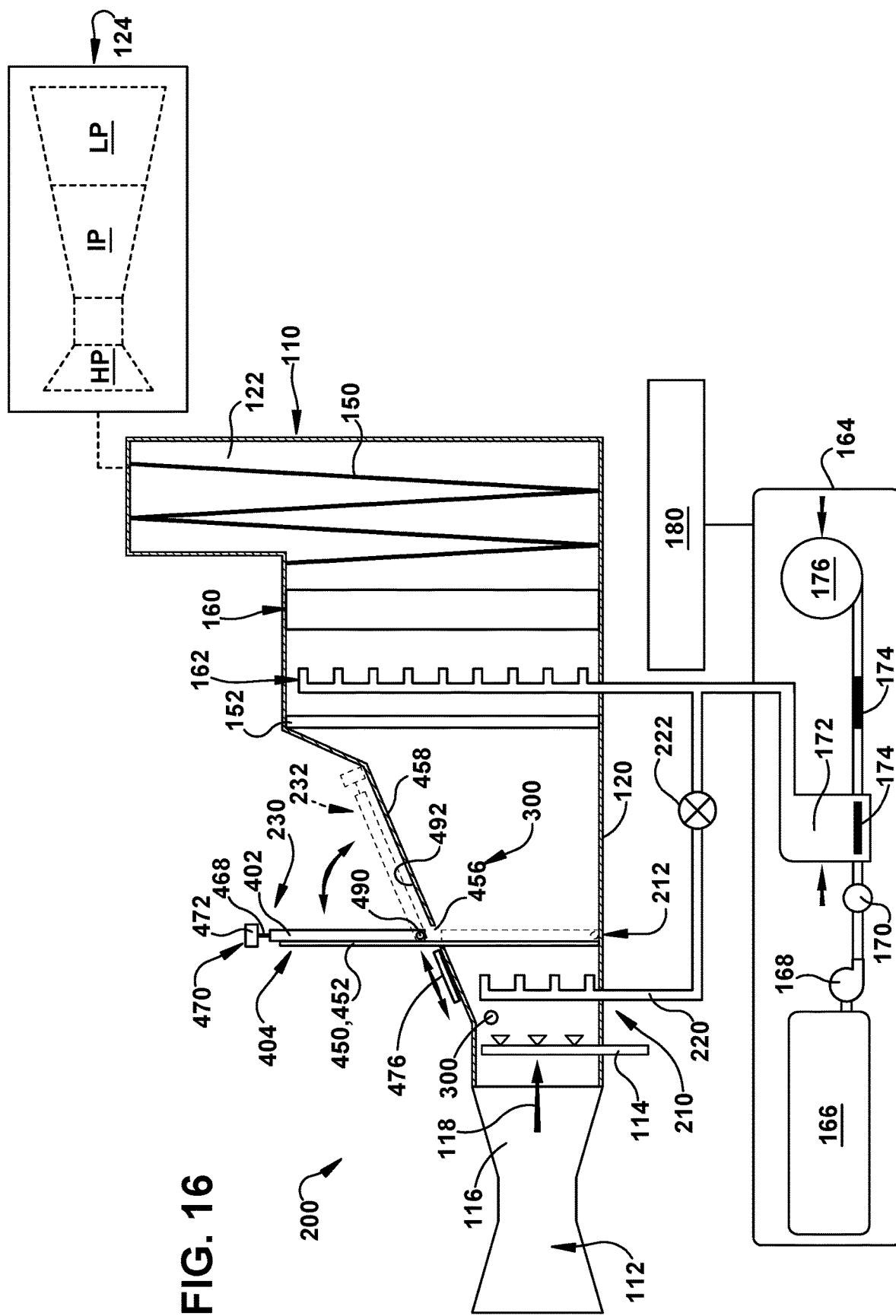
FIG. 16 shows a cross-sectional view of part of an emission reduction system according to an embodiment of the disclosure.
Figure 17:
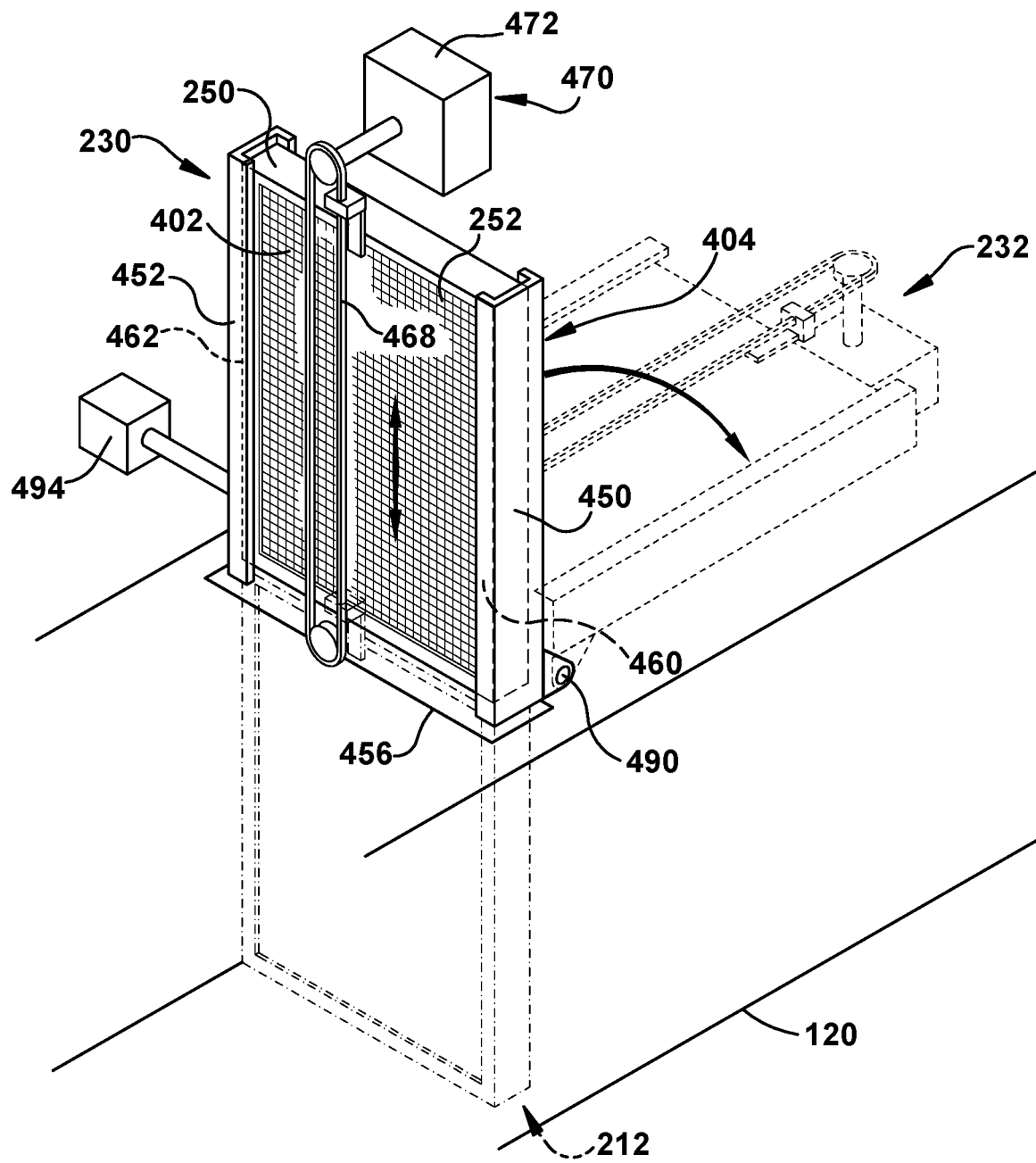
FIG. 17 shows a cross-sectional view of a retraction system according to an embodiment of the disclosure.

Referring to FIGS. 15-18, ER system 200 for power plant 110 including gas turbine 116 according to another embodiment is illustrated. In this embodiment, an emission filter 402 includes a single panel similar in structure to panels 240A-E (FIGS. 6-8) and panels 340, 342 (FIG. 14), but sized to extend across a cross-sectional area of exhaust passage 120 so as to cover all of the exhaust path. In the example shown, emission filter 402 selectively moves vertically between first location 212 and second location 230. As shown in FIG. 17, emission filter 402 may include, as with previous embodiments, an open structure frame 250 having filter medium 252 therein through which exhaust 118 passes to remove an exhaust component of the exhaust of the gas turbine. As in previously described embodiments, emission filter 402 may include an SCR filter for SCR system 210, as shown in FIG. 15, a CO catalyst filter (like in FIG. 6) or a combination SCR and CO filter.

Retraction system 404 is operably coupled to exhaust passage 120 of gas turbine 116. In this embodiment, retraction system 404 selectively vertically moves emission filter 402 through an opening 456 in an upper wall 458 of exhaust passage 120 between first location 212 within the exhaust path within the exhaust passage and a second location 230 out of the exhaust path. As shown best in FIG. 16, opening 456 may include a closure 476 therefor. Closure 476 may include any form of automated closing element, e.g., a sliding closure, pivoting door, etc., controllable by controller 180 and capable of sealing exhaust passage 120 from outside when emission filter 402 is not in use.

Retraction system 404 may take a variety of forms. In one example, shown in FIGS. 16 and 17, retraction system 404 is similar to that shown in FIG. 14, except it is set vertically and moves emission filter 402 vertically instead of horizontally. Here, retraction system 404 may include a first bearing track 450 extending vertically from within exhaust passage 120 through opening 456 (in upper wall 458) in exhaust passage 120. Bearing track 450 is configured (e.g., sized and shaped) to direct a first side 460 of emission filter 402 through opening 456. Similarly, retraction system 404 may include a second bearing track 452 extending vertically from within exhaust passage 120 through opening 456 in the exhaust passage and configured to direct a second side 462 of the emission filter 402 through opening 456. In the example shown, bearing tracks 450, 452 include U-shaped elements, but any element capable of laterally guiding emission filter 402 may be provided. In the example shown, emission filter 402 may not include any bearings thereon, but as described relative to panels 340, 342 (FIG. 14), emission filter 402 may include one or more bearings for engaging a respective bearing track 450, 452, if necessary, for vertically guided movement. Any bearing mechanisms for allowing movement may be provided such as: rollers/wheels, skids or rolling tracks.

ER system 200 according to the FIGS. 15-17 embodiments may also include an actuator 470 configured to move emission filter 402 between first location 212 within the exhaust path within exhaust passage 120 and second location 230 vertically outside of the exhaust passage. Actuator 470 can take a variety of forms. In one embodiment, shown best in FIGS. 16-17, actuator 470 may include a linkage 468 to a motor 472 that forces movement of emission filter 402 along bearing tracks 450, 452, e.g., such as a loop of chain movable by motor 472 and coupled to panel 340 or 342. There are a large variety of actuators capable of providing this sort of movement, all of which are considered within the scope of the disclosure. In one embodiment, shown in FIG. 17 actuator 470 is similar to a garage door actuator, e.g., a motor under control of controller 180 and a chain configured to move emission filter 402 along bearing tracks 450, 452. In another embodiment, shown in FIGS. 18 and 19, actuator 470 may include a motor(s) 478 having a rotating gear 480 that meshes with a pinion gear(s) 482 on one or both sides of emission filter 404 to raise and lower the emission filter. This sort of rack-and-pinion actuator can also be applied to the side entry embodiments such as shown in FIG. 14.

ER system 200 according to this embodiment may also include, as shown in FIGS. 16-19, a pivot element 490 coupled to emission filter 402. As shown best in FIGS. 16 and 19, pivot element 490 permits pivoting of emission filter 402 from second location 230 to a storage location 232 in which emission filter 402 is positioned adjacent an upper, exterior side 492 of exhaust passage 120. Pivoting of emission filter 402 may be controlled by a motor 494 coupled to pivot element 490, outside of exhaust passage 120.

As shown in FIG. 15, a filter enclosure 500 configured to receive emission filter 402 in second location 230 and movable to storage location 232 may also be provided. As in previous embodiments, filter enclosure 500 may include a closure 502 for closing an opening therein through which emission filter 402 enters the filter enclosure.

Figure 20:
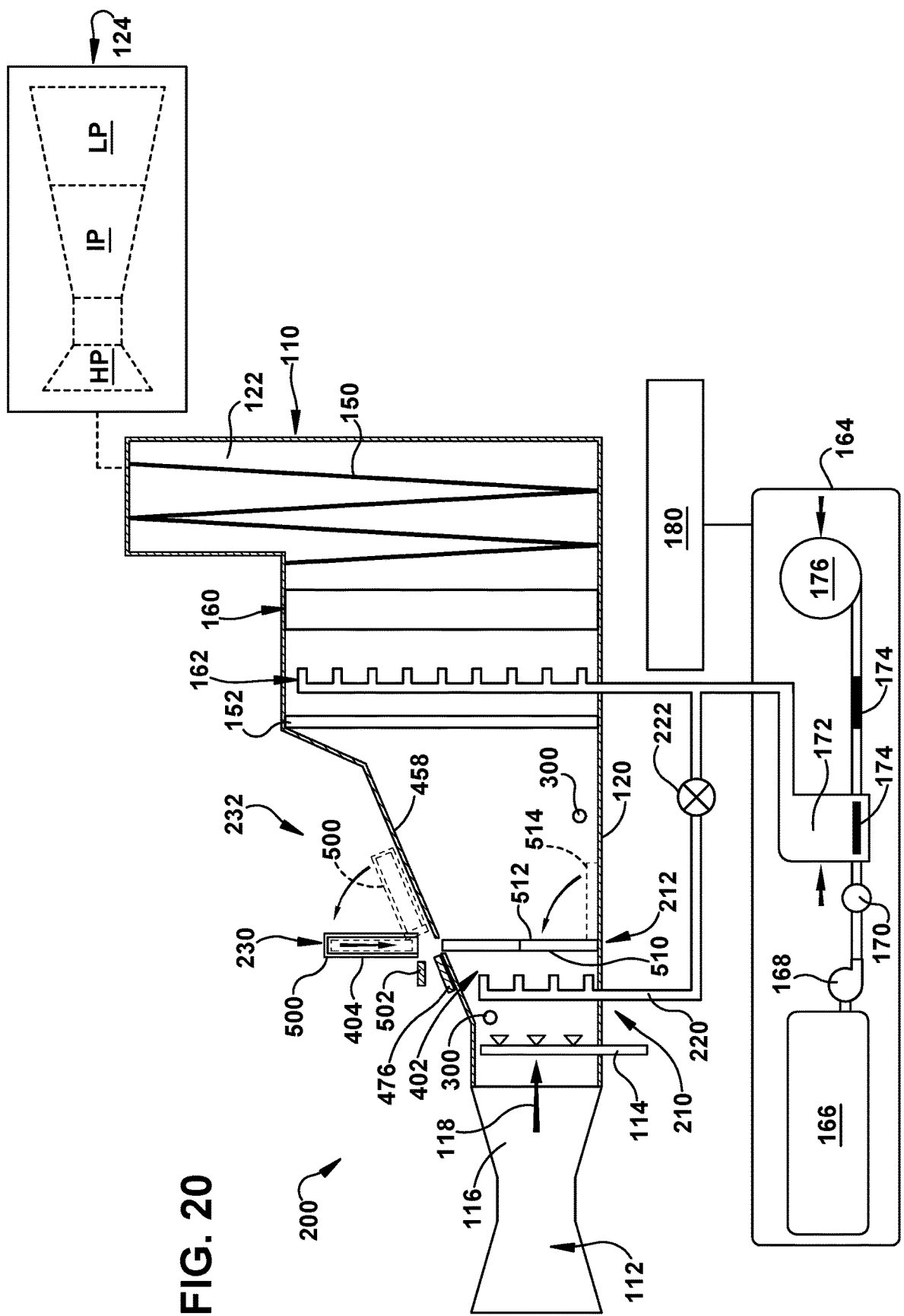
FIG. 20 shows a cross-sectional view of part of an emission reduction system according to another embodiment of the disclosure.

FIG. 20 shows an alternative embodiment that is similar to those in FIGS. 15-19. In this embodiment, however, emission filter 402 extends across only a portion of the exhaust path in first location 212, e.g., 30-70%. That is, emission filter 402 does not cover an entire cross-sectional area of exhaust passage 120. In this embodiment, a damper 510 may be selectively movable between an operative location 512 in which the damper extends across a remaining portion of the exhaust path not covered by emission filter 402, and a retracted position 514 outside of the exhaust path. In this embodiment, a smaller emission filter 402 can be employed and damper 510 can act to control the exhaust path to force exhaust 118 through the emission filter 402. In the retracted position, damper 510 is substantially out of the exhaust path so as to provide no resistance to exhaust 118 passing through exhaust passage 120. In one particular example, emission filter 402 may include a CO catalyst filter that extends across only a portion of the exhaust path in first location 212, and damper 510 is selectively movable between an operative location 512 in which the damper extends across a remaining portion of the exhaust path not covered by the CO catalyst filter and retracted position 514 outside of the exhaust path. Damper 510 can be pivotably mounted or slidably mounted, and can include any appropriate mechanism to control moving thereof, e.g., a hydraulic ram, motor, etc. Retraction system 404 operates similarly to described relative to FIGS. 15-19.

Controller 180 is operably coupled to retraction system 204, 304, 404 and is configured to instruct retraction system 204, 304, 404 to move emission filter 202, 302, 402 between first location 212 and second location 230 in response to an emission condition of exhaust 118 from gas turbine 116. Controller 180 may move the emission filter regardless of the embodiment employed herein, e.g., panels 240A-E (FIGS. 7-8), panels 340, 342 (FIGS. 10-14) or single panel emission filter 402 (FIGS. 15-20). Controller 180 may be part of a larger power plant control system (not shown) or may be a separate entity that cooperates with a larger power plant control system. In any event, controller 180, via hardware and/or software, controls any retraction system(s) described herein and controls any ancillary equipment necessary to operate of ER system 200 such as but not limited to control valve 222 (e.g., FIG. 3) of any SCR system 210 employed that delivers reducing agent to injector 220. In one embodiment, first location 212 at which emission filter 202, 302, 402 may be employed is selected to provide the best possible emission filtering for the toxin to be reduced at the emission condition(s) at the anticipated plant low load conditions. While not limited to startup or low load conditions, ER system 200 is particularly advantageous during such load conditions during which certain toxins such as carbon monoxide (CO) or nitrous dioxide are high but conventional emission filtering equipment (i.e., those downstream of heat exchange piping in HRSG 122) is not operational. Low load conditions may include, for example, loads of less than 15% of the full load of gas turbine 116 or combined cycle power plant 10. To this end, first location 212 may be selected to be close enough to turbine 116 that emission condition(s) is/are sufficient to ensure operation of emission filter 202, 302, 402 during the desired loads.

Emission condition(s) may include any number of exhaust conditions or combinations thereof. For example, a certain exhaust temperature may be necessary for certain emission filters, e.g., SCR filter 206, to operate. Further, operation of ER system 200 according to embodiments of the disclosure may not be desired unless certain exhaust component(s) (e.g., $CO_2$, CO or NOx, etc.) level(s) are high. To this end, ER system 200 may include any number of emission condition sensors 300 operative to sense one or more emission conditions such as at least one of an exhaust temperature of exhaust 118, and at least one exhaust component level. While certain emission sensors 300 are shown, it is emphasized that others may also be provided, wherever necessary. The emission conditions can be raw data as measured by a particular sensor 300 or may be interpolated data such as an emission component amount per hour being exhausted to atmosphere based on an emission component level within exhaust 118 as measured by a particular sensor 300 and an exhaust rate flow, turbine load or other parameter indicative of exhaust flow. Such interpolations are well known determinations made by controller 180, and can be made in any now known or later developed fashion. ER system 200 may also include any other necessary sensors now known or later developed such as but not limited to position sensors to determine emission filter 202, 302, 402, closure or damper locations.

In operation, according to one embodiment, controller 180 may instruct retraction system 204, 304, 404 to move emission filter 202, 302, 402 to first location 212 in response to the exhaust temperature of exhaust 118 being within a predetermined temperature range, i.e., as measured by an appropriate temperature sensor (sensors 300). In one embodiment, the predetermined temperature range may between 398° Celsius and 537° Celsius (i.e., 750-1000° Fahrenheit); however, the range may vary based on many factors such as turbine 116 size, expected emission components requiring reduction, etc. Further, controller 180 may instruct retraction system 204, 304, 404 to move emission filter 202, 302, 402 to second location 230, out of the exhaust path, in response to the exhaust temperature being outside the predetermined temperature range, e.g., higher than 398° C.

In another embodiment, controller 180 may instruct retraction system 204, 304, 404 to move emission filter 202, 302, 402 to first location 212 in response to at least one exhaust component level exceeding a respective exhaust component limit. For example, the exhaust component may be CO having a level greater than 2.0 parts per million as measured by a sensor(s) 300 that measures CO content, and/or may be NOx having a level that equates to greater than 19 kilograms per hour being exhausted to atmosphere as measured by a sensor(s) 300 that measure NOx content. Further, controller 180 may instruct retraction system 204, 304, 404 to move emission filter 202, 302, 402 to second location 230 in response to the at least one exhaust component level not exceeding the respective exhaust component limit. Once a load and other conditions that indicate the operativeness of ER system 200 is no longer necessary or possible, e.g., exhaust temperature has reach greater than 398° C., retraction system 204, 304, 404 can retract emission filter 202, 302, 402 to second location 230. Here, conventional emission reduction systems such as CO catalyst filter 152 and/or SCR system 154 in HRSG 122 are operational.

It is understood that emission filter 202, 302, 402 can be configured in any number of ways to provide the functionality herein. Each filter 202, 302, 402, in an operative state, may extend up to, for example, 30 meters, and have a thickness less than approximately 0.6 meters.

The foregoing drawings show some of the processing associated according to several embodiments of this disclosure. It should also be noted that in some alternative implementations, the acts described may occur out of the order noted or, for example, may in fact be executed substantially concurrently or in the reverse order, depending upon the act involved. Also, one of ordinary skill in the art will recognize that additional steps that describe the processing may be added.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. "Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise. "Approximately" as applied to a particular value of a range applies to both values, and unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. An emission reduction system for a power plant including a gas turbine, the system comprising:
    an emission filter;
    a retraction system operably coupled to an exhaust passage of the gas turbine, the exhaust passage defining an exhaust path of exhaust from the gas turbine, the retraction system selectively moving the emission filter between a first location within the exhaust path and a second location outside of the exhaust path; and
    a controller operably coupled to the retraction system configured to instruct the retraction system to move the emission filter between the first location and the second location in response to an emission condition of the exhaust from the gas turbine,
    wherein the emission condition includes an exhaust temperature of the exhaust, and
    wherein the controller instructs the retraction system to move the emission filter to the first location in response to the exhaust temperature of the exhaust being within a predetermined temperature range, and instructs the retraction system to move the emission filter to the second location in response to the exhaust temperature being outside the predetermined temperature range.

2. The emission reduction system of claim 1, wherein the power plant further includes a heat recovery steam generator (HRSG) operably coupled to the exhaust passage of the gas turbine for generating steam for a steam turbine, and wherein the first location is upstream of the HRSG.

3. The emission reduction system of claim 1, wherein the emission condition includes at least one exhaust component level.

4. The emission reduction system of claim 1, wherein the predetermined temperature range is between 398° Celsius and 537° Celsius.

5. The emission reduction system of claim 3, wherein the controller instructs the retraction system to move the emission filter to the first location in response to the at least one exhaust component level exceeding a respective exhaust component limit, and instructs the retraction system to move the emission filter to the second location in response to the at least one exhaust component level not exceeding the respective exhaust component limit.

6. The emission reduction system of claim 1, wherein the emission filter includes a carbon monoxide (CO) catalyst filter.

7. The emission reduction system of claim 1, wherein the emission filter includes a selective catalytic reduction (SCR) filter, and further comprising an SCR reducing agent injector upstream of the first location of the exhaust passage.

8. The emission reduction system of claim 7, further comprising a carbon monoxide (CO) catalyst filter downstream of the SCR filter and upstream of a heat recovery steam generator (HRSG) operably coupled to the exhaust passage of the gas turbine for generating steam for a steam turbine.

9. The emission reduction system of claim 1, wherein the emission filter includes a series of pivotally coupled panels, each respective panel of the series of pivotally coupled panels including an open structure frame having a filter medium therein through which the exhaust passes and a pair of opposing bearings extending from opposing ends of the respective panel.

10. The emission reduction system of claim 9, wherein the retraction system includes:
    a pair of bearing tracks, each track of the pair of bearing tracks configured to receive a respective bearing from one of the pairs of opposing bearings of the series of pivotally coupled panels, the pair of bearing tracks each including a first portion arranged to position the emission filter at the first location in the exhaust passage in response to the respective bearings being in the first portion, a second portion arranged to position the emission filter at the second location in response to the respective hearings being in the second portion, and a transition portion coupling the first portion and the second portion, and
    an actuator configured to move the emission filter along the pair of bearing tracks.

11. The emission reduction system of claim 1, further comprising an emission filter enclosure within the exhaust passage, wherein the second location positions the emission filter within the emission filter enclosure.

12. The emission reduction system of claim 1, wherein the exhaust passage includes an opening configured to permit movement of the emission filter therethrough to an outside of the exhaust passage, and
    further comprising an emission filter enclosure outside of the exhaust passage, wherein the second location positions the emission filter within the emission filter enclosure.

13. The emission reduction system of claim 1, further comprising an exhaust flow distributor upstream of the emission filter.

14. A method of reducing emissions for a power plant including a gas turbine, the method comprising:
    providing an emission filter operably coupled to a retraction system that is operably coupled to an exhaust passage of the gas turbine, the exhaust passage defining an exhaust path of exhaust from the gas turbine; and
    selectively moving the emission filter, using the retraction system, between a first location within the exhaust path and a second location outside of the exhaust path in response to an emission condition of the exhaust from the gas turbine,
    wherein the emission condition includes at least one of: an exhaust temperature of the exhaust and at least one exhaust component level, and
    wherein the selective moving includes moving the emission filter to the first location in response to the exhaust temperature of the exhaust being within a predetermined temperature range, and moving the emission filter to the second location in response to the exhaust temperature being outside the predetermined temperature range.

15. The method of claim 14, wherein the power plant further includes a heat recovery steam generator (HRSG) operably coupled to the exhaust passage of the gas turbine for generating steam for a steam turbine, and wherein the first location is upstream of the HRSG.

16. The method of claim 14, wherein the selective moving includes moving the emission filter to the first location in response to the at least one exhaust component level exceeding a respective exhaust component limit, and moving the emission filter to the second location in response to the at least one exhaust component level not exceeding the respective exhaust component limit.

\* \* \* \* \*